US011034278B2

(12) United States Patent
Kloepfer et al.

(10) Patent No.: US 11,034,278 B2
(45) Date of Patent: Jun. 15, 2021

(54) CYLINDRICAL CARGO CONTAINER CONSTRUCTION

(71) Applicants: Titan Trailers Inc., Delhi (CA); Michael Kloepfer, Delhi (CA)

(72) Inventors: Michael Kloepfer, Delhi (CA); Trever Lorne Howden, Delhi (CA); Christopher Howard Kloepfer, Tillsonburg (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 16/471,835

(22) PCT Filed: Dec. 19, 2017

(86) PCT No.: PCT/CA2017/051544
§ 371 (c)(1),
(2) Date: Jun. 20, 2019

(87) PCT Pub. No.: WO2018/112622
PCT Pub. Date: Jun. 28, 2018

(65) Prior Publication Data
US 2020/0094727 A1  Mar. 26, 2020

Related U.S. Application Data

(60) Provisional application No. 62/436,960, filed on Dec. 20, 2016, provisional application No. 62/562,001, filed on Sep. 22, 2017.

(51) Int. Cl.
*B60P 3/22* (2006.01)
*B65D 88/06* (2006.01)
(Continued)

(52) U.S. Cl.
CPC ........... *B60P 3/2205* (2013.01); *B21C 37/08* (2013.01); *B23K 11/08* (2013.01); *B23K 33/006* (2013.01); *B65D 88/06* (2013.01)

(58) Field of Classification Search
CPC ... B60P 3/2205; B65D 88/06; B23K 2101/12; B21D 5/10
(Continued)

(56) References Cited

U.S. PATENT DOCUMENTS 1,847,310 A * 3/1932 Schmitz .............. B21C 37/0815
228/151
1,966,244 A    7/1934 Hansen
(Continued)

FOREIGN PATENT DOCUMENTS

CN    101269435 A    9/2008
CN    102248314 A    11/2011
(Continued)

OTHER PUBLICATIONS

Machine Translation of CN-103273252-B (Year: 2015).*
(Continued)

*Primary Examiner* — Jacob J Cigna
*Assistant Examiner* — Michael W Hotchkiss
(74) *Attorney, Agent, or Firm* — McCarter & English, LLP

(57) ABSTRACT

A method of manufacturing a cylindrical cargo container includes: providing a plurality of rigid panels together formable into a cylindrical shell; forming a first semi-cylindrical shell from a first set of the panels; forming a second semi-cylindrical shell from a second set of the panels; forming the cylindrical shell from the first semi-cylindrical shell and the second semi-cylindrical shell; forming a collar conformably encircling the cylindrical shell; constricting the collar to compress joints formed at abutting edges of pairs of adjacent panels; rolling the cylindrical shell and collar to bring respective joints of pairs of panels to a lower position, and welding an inside seam of the joint when at the lower position; removing the collar from the cylin-
(Continued)

drical shell; and rolling the cylindrical shell to bring respective joints of pairs of panels to an upper position, and welding an outside of the joint when at the upper position.

29 Claims, 22 Drawing Sheets

(51) Int. Cl.
  *B23K 11/08* (2006.01)
  *B21C 37/08* (2006.01)
  *B23K 33/00* (2006.01)

(58) Field of Classification Search
  USPC .................................. 138/171, 157; 219/66
  See application file for complete search history.

(56) References Cited

U.S. PATENT DOCUMENTS

| | | | |
|---|---|---|---|
| 2,458,686 A | 1/1949 | Davie | |
| 2,486,378 A * | 11/1949 | Amiot | B64F 5/10 29/243.53 |
| 2,777,606 A | 1/1957 | Moore et al. | |
| 3,131,949 A | 5/1964 | Black | |
| 3,159,911 A * | 12/1964 | Albert | B21C 37/0815 228/151 |
| 3,187,425 A | 6/1965 | Black et al. | |
| 3,374,528 A | 3/1968 | Bowcutt et al. | |
| 3,575,312 A | 4/1971 | Luisada | |
| 3,625,137 A | 12/1971 | Johnson | |
| 3,734,387 A * | 5/1973 | Sannipoli | B23K 9/0282 228/6.1 |
| 3,823,842 A | 7/1974 | Chang | |
| 3,935,993 A | 2/1976 | Doyen et al. | |
| 3,971,491 A | 7/1976 | Mowatt-Larssen et al. | |
| 4,025,034 A * | 5/1977 | Randolph | B23K 9/035 228/41 |
| 4,081,651 A * | 3/1978 | Randolph | B23K 11/093 219/159 |
| 4,259,776 A * | 4/1981 | Roda | B64B 1/06 29/423 |
| 4,341,938 A * | 7/1982 | Matsubara | B23K 9/0253 174/15.7 |
| 4,500,764 A * | 2/1985 | Girodi | B23K 9/0284 219/59.1 |
| 4,504,047 A * | 3/1985 | Jantzen | B23Q 1/76 269/287 |
| 5,047,101 A | 9/1991 | Trussler | |
| D350,839 S | 9/1994 | Ledesma | |
| 5,435,478 A * | 7/1995 | Wood | B23K 9/0286 219/130.01 |
| 5,662,145 A | 9/1997 | Stagg | |
| 5,697,511 A | 12/1997 | Bampton | |
| 6,012,892 A | 1/2000 | Stragier | |
| 6,247,634 B1 * | 6/2001 | Whitehouse | B23K 20/126 228/112.1 |
| 6,276,058 B1 * | 8/2001 | Gallinger | B23K 31/02 29/281.1 |
| 6,505,393 B2 * | 1/2003 | Stoewer | B21J 15/10 29/243.53 |
| 6,581,819 B1 | 6/2003 | Aota et al. | |
| 6,688,673 B2 | 2/2004 | Kloepfer | |
| 6,719,360 B1 | 4/2004 | Backs | |
| 6,840,433 B2 * | 1/2005 | Vermaat | B23K 37/0533 228/212 |
| 6,854,789 B2 | 2/2005 | Kloepfer | |
| 6,875,942 B2 | 4/2005 | Coughlin et al. | |
| 7,430,888 B2 | 10/2008 | Osame | |
| 7,596,843 B2 * | 10/2009 | Spishak | B64F 5/10 269/28 |
| 7,748,592 B2 * | 7/2010 | Koga | B23K 20/1245 228/112.1 |
| 7,802,412 B2 * | 9/2010 | Jensen | E04H 12/085 52/651.07 |
| 7,950,722 B2 | 5/2011 | Booher | |
| 7,975,622 B2 | 7/2011 | Dalrymple et al. | |
| D653,587 S | 2/2012 | Haut et al. | |
| 8,132,708 B1 * | 3/2012 | Potter | B23K 20/126 228/112.1 |
| D658,548 S | 5/2012 | Silva e Costa et al. | |
| D668,582 S | 10/2012 | Doron | |
| 8,313,595 B2 | 11/2012 | Blanc et al. | |
| 8,408,443 B2 * | 4/2013 | Miryekta | B23K 20/122 228/2.1 |
| 8,534,530 B2 * | 9/2013 | Biggs | B23K 20/126 228/2.1 |
| 8,590,276 B2 * | 11/2013 | Kryger | E04H 12/085 52/845 |
| D710,763 S | 8/2014 | Maiorana et al. | |
| 8,985,376 B2 | 3/2015 | Musso | |
| 9,090,328 B2 | 7/2015 | Goehlich | |
| 9,457,932 B2 * | 10/2016 | Kenealy | B65D 25/20 |
| 9,469,352 B2 | 10/2016 | Booher et al. | |
| 9,789,916 B1 | 10/2017 | Beelman, III et al. | |
| 10,046,865 B2 * | 8/2018 | Smith | B64F 5/50 |
| 10,086,962 B2 * | 10/2018 | Granger | B21B 39/04 |
| 2006/0118235 A1 * | 6/2006 | Lum | B64F 5/10 156/285 |
| 2007/0256288 A1 * | 11/2007 | Vermaat | B23K 37/0533 29/464 |
| 2008/0143142 A1 | 6/2008 | Lemmons | |
| 2008/0256776 A1 * | 10/2008 | Neuhaus | B64F 5/10 29/446 |
| 2009/0288719 A1 | 11/2009 | Adams et al. | |
| 2010/0213244 A1 * | 8/2010 | Miryekta | B23K 37/0229 228/112.1 |
| 2011/0031257 A1 | 2/2011 | Metz | |
| 2011/0198145 A1 | 8/2011 | Bullis | |
| 2013/0206778 A1 | 8/2013 | Lukyanets et al. | |
| 2013/0292387 A1 | 11/2013 | Spencer et al. | |
| 2014/0150871 A1 | 6/2014 | Goodier | |
| 2014/0265436 A1 | 9/2014 | Maiorana et al. | |
| 2014/0366771 A1 * | 12/2014 | Bianchi | F17C 1/00 105/360 |
| 2015/0031122 A1 * | 1/2015 | Claypool | C12M 23/44 435/290.3 |
| 2016/0129826 A1 | 5/2016 | Yielding et al. | |
| 2016/0339968 A1 | 11/2016 | Kloepfer et al. | |
| 2017/0254477 A1 | 9/2017 | Schimenti et al. | |
| 2017/0299057 A1 | 10/2017 | Doetzer | |
| 2018/0017214 A1 | 1/2018 | Hermiller et al. | |
| 2018/0187835 A1 | 7/2018 | Brunsch | |

FOREIGN PATENT DOCUMENTS

| | | |
|---|---|---|
| CN | 202130744 U | 2/2012 |
| CN | 102803054 A | 11/2012 |
| CN | 203855052 U | 10/2014 |
| CN | 104590407 A | 5/2015 |
| CN | 103273252 B * | 8/2015 |
| CN | 204893326 U | 12/2015 |
| CN | 205386696 U | 7/2016 |
| DE | 102009037609 A1 | 2/2011 |
| EP | 0090334 A2 | 10/1983 |
| EP | 1350654 A1 | 10/2003 |
| EP | 2236439 B1 | 5/2012 |
| GB | 1162937 A | 9/1969 |
| JP | S5835074 A | 3/1983 |
| JP | S5939477 A | 3/1984 |
| JP | 2008179376 A | 8/2008 |
| JP | 2013169594 A | 9/2013 |
| WO | 2013083177 A1 | 6/2013 |
| WO | 2014139531 A1 | 9/2014 |
| WO | 2016118152 A1 | 7/2016 |
| WO | 2016170192 A1 | 10/2016 |
| WO | 2016173587 A1 | 11/2016 |

OTHER PUBLICATIONS

International Search Report and Written Opinion of the International Searching Authority dated Aug. 24, 2018, issued in connec-

(56) References Cited

OTHER PUBLICATIONS tion with International Application No. PCT/CA2018/050730 (12 pages).
Written Opinion of the International Preliminary Examining Authority dated Aug. 27, 2019, issued in connection with International Application No. PCT/CA2018/050730 (5 pages).
Office Action dated Jan. 2, 2020, issued by the Canadian Intellectual Property Office in connection with Canadian Patent Application No. CA3039566 (4 pages).
Office Action dated Nov. 7, 2019, issued by the Canadian Intellectual Property Office in connection with Canadian Patent Application No. CA3039568 (5 pages).
International Search Report of the International Searching Authority dated Mar. 12, 2018, issued in connection with International Application No. PCT/CA2017/051544 (3 pages).
Written Opinion of the International Searching Authority dated Mar. 12, 2018, issued in connection with International Application No. PCT/CA2017/051544 (4 pages).
International Preliminary Report on Patentability dated Apr. 4, 2019, issued in connection with International Application No. PCT/CA2017/051544 (8 pages).
Canadian Patent Application No. CA3039566, Office Action dated Sep. 3, 2019 (5 pages).
International Patent Application No. PCT/CA2017/051538, International Preliminary Report on Patentability dated Apr. 4, 2019 (23 pages).
International Patent Application No. PCT/CA2017/051538, International Search Report and Written Opinion dated Mar. 16, 2018 (9 pages).
Non-Final Office Action dated Aug. 6, 2018, issued in connection with U.S. Appl. No. 29/588,405 (10 pages).
Ex Parte Quayle Action dated Jun. 25, 2019, issued in connection with U.S. Appl. No. 29/588,405 (5 pages).
Final Office Action dated Mar. 4, 2019, issued in connection with U.S. Appl. No. 29/588,405 (11 pages).
Restriction Requirement dated Jan. 10, 2018, issued by the United States Patent and Trademark Office in connection with U.S. Appl. No. 29/588,405 (6 pages).
Notice of Allowance dated Oct. 23, 2019, issued by the United States Patent and Trademark Office in connection with U.S. Appl. No. 29/588,405 (5 pages).
Office Action dated Feb. 20, 2020, issued by the United States Patent and Trademark Office in connection with U.S. Appl. No. 29/588,405 (7 pages).
Response to Written Opinion filed with the Canadian Receiving Office dated May 30, 2018, in connection with International Patent Application No. PCT/CA2017/051544 (24 pages).
Response to Written Opinion filed with the Canadian Receiving Office dated Jun. 22, 2018, in connection with International Patent Application No. PCT/CA2017/051538 (18 pages).
International Preliminary Report on Patentability of the International Preliminary Examining Authority dated Dec. 12, 2019 in connection with International Application No. PCT/CA2018/050730, including Response to Written Opinion filed Sep. 20, 2019 (35 pages).
Office Action dated Apr. 20, 2020, issued in connection with Canadian Patent Application No. CA3069573 (4 pages).
Extended European Search Report dated Jul. 9, 2020, issued by the European Patent Office in connection with European Patent Application No. 17883510.4 (8 pages).
Office Action dated Sep. 15, 2020, issued by the Canadian Intellectual Property Office in connection with Canadian Patent Application No. CA3090574 (3 pages).
Extended European Search Report dated Oct. 6, 2020, issued in connection with European Patent Application No. 17882950.3 (8 pages).
Notice of Allowance dated Dec. 11, 2020, issued in connection with U.S. Appl. No. 29/588,405 (7 pages).
Chinese Office Action dated Jan. 20, 2021, issued in connection with Chinese Patent Application No. 201780086854.8 (6 pages)—English Translation Not Available.
Chinese Office Action dated Jan. 27, 2021, issued in connection with Chinese Patent Application No. 201780086876.4 (11 pages)—English Translation Not Available.
Canadian Office Action dated Feb. 9, 2021, issued in connection with Canadian Patent Application No. 3,066,386 (3 pages).
Canadian Office Action dated Feb. 9, 2021, issued in connection with Canadian Patent Application No. 3,066,390 (4 pages).
Canadian Office Action dated Mar. 1, 2021, issued in connection with Canadian Patent Application No. 3,066,393 (3 pages).
Canadian Office Action dated Mar. 9, 2021, issued in connection with Canadian Patent Application No. 3,066,401 (4 pages).
Canadian Office Action dated Apr. 29, 2021, issued in connection with Canadian Patent Application No. 3,090,574 (5 pages).

* cited by examiner

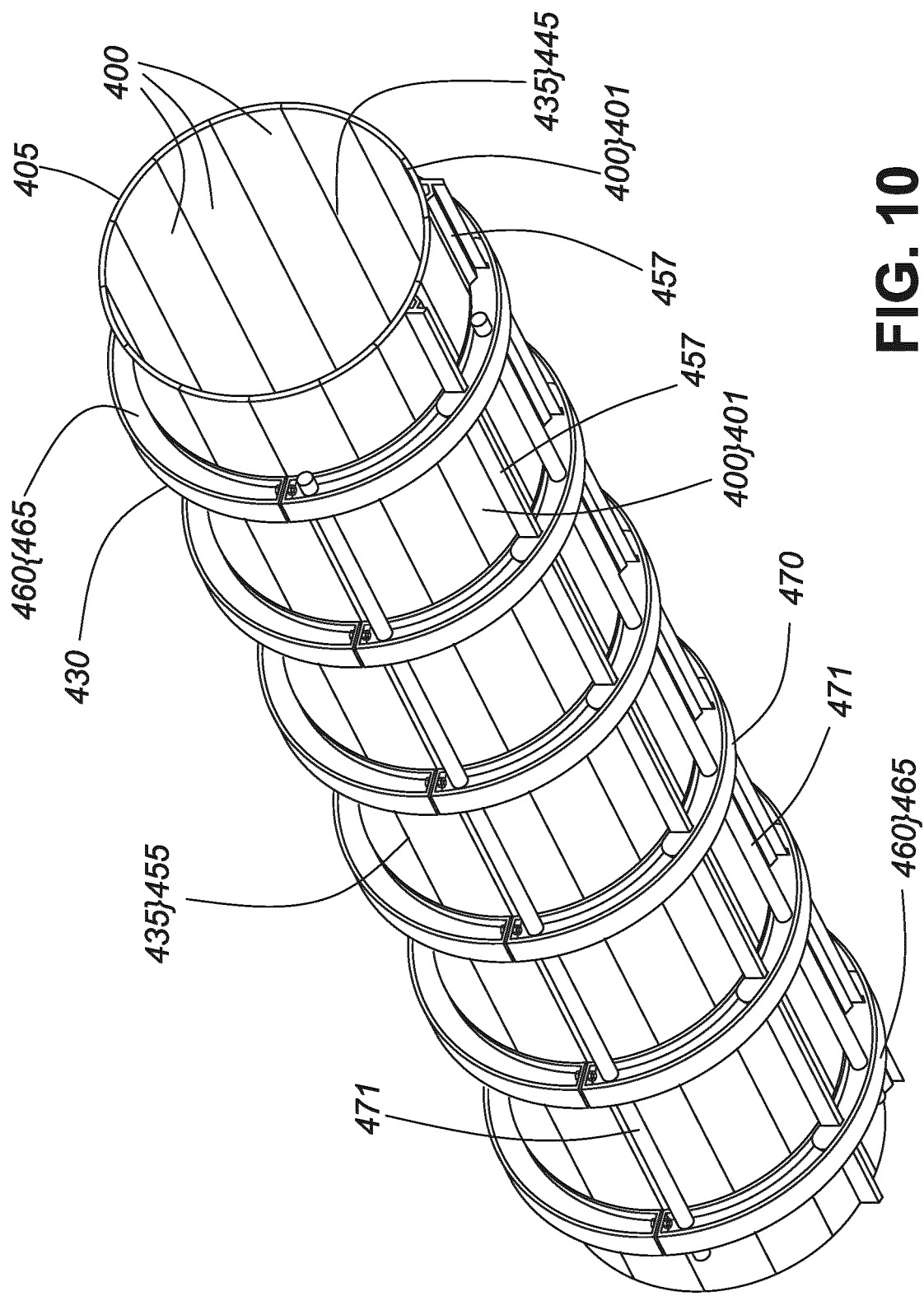

CYLINDRICAL CARGO CONTAINER CONSTRUCTION

RELATED APPLICATIONS

The present application is a U.S. National Phase Application under 35 U.S.C. § 371 of International Application No. PCT/CA2017/051544 filed on Dec. 19, 2017, which claims the benefit of priority to United States Provisional patent application Ser. No. 62/562,001 filed on Sep. 22, 2017, and to United States Provisional patent application Ser. No. 62/436,960 filed on Dec. 20, 2016, the entire disclosures of all of which are expressly incorporated by reference herein.

FIELD

The present disclosure relates generally to cylindrical cargo containers including cylindrical cargo containers for tanker trucks, trailers, and railcars, as well as tanker trucks, trailers, and railcars having cylindrical cargo containers.

BACKGROUND

Cylindrical cargo containers, such as the containers for tanker (or tank) trucks, trailers, and railcars, are widely used to transport various materials such as liquefied loads, dry bulk cargo, or gases on roads or rails. Whether incorporated in a tanker truck where the container is mounted on a chassis and wheeled suspension commonly with the truck, or a tanker trailer where the container is mounted on its own chassis and wheeled suspension which is towed by a tractor, or a railroad tanker car, the container is typically cylindrical in shape and is mounted on and supported by a chassis and wheeled suspension. Other configurations are possible.

Cylindrical cargo containers have many advantages which explain their widespread use. Based on simple geometry, for any given volume a cylinder has a smaller surface area than a typical rectangular, box-shaped cargo container. As such, all other factors being equal, a cylindrical container can have both a higher ratio of cargo weight to container weight, and of cargo weight to container materials than a container of another shape. Moreover, cylindrical containers typically have a more aerodynamic shape. Both of these factors result in a lesser towing or carrying load, and thus lesser truck or tractor power requirements, and better fuel economy.

Typically, such cylindrical containers have a construction including a skin formed of a rigid and resilient plate material, usually metal, such as rolled sheet steel or aluminum, and a frame structure, such as annular and longitudinal ribbed beam structure, which may include vertical bands or ribs, to provide shape and strength, and to support the skin, which is affixed to the frame, sometimes by welds. In other cases, a less sturdy and resilient material is used, such as fiberglass or reinforced plastic. In any event, the frame is typically mounted on and supported by the chassis of the truck, trailer, or railcar, and thus the weight of any load contained by the tank is communicated to the chassis ultimately by this frame.

While sometimes the structural frame is disposed at least partly outside of the sheet metal skin, such that at least part of the structural frame is exposed to the outside, doing so usually has the disadvantage of degrading the aerodynamics of the container resulting from wind resistance at the projecting portions. As such, in many cases, the structural frame is completely or mostly enveloped by the sheet metal skin. In some cases, doing so presents a different kind of disadvantage, including for example reduction of the useful volume of the container, or inclusion of obstructions within the container which may impede movement of its contents.

While, as noted, cylindrical tanks are widely used to haul many types of cargo, they are not generally used to haul solid waste such as municipal or industrial garbage. Certain problems arise in this connection, including that cylindrical trailers of conventional construction, as described above, which are sufficiently rigid to withstand the force of garbage compaction, require a volume of structural frame members which renders the trailer too heavy with respect to the economies applicable to waste hauling. To put it another way, while cylindrical trailers of conventional construction were known, their use for hauling waste was uneconomical.

Moreover, in connection with any type of cargo, it is desirable to achieve yet greater efficiencies and advantages from improved construction and use of cylindrical containers which reduce cost and provide new and enhanced uses.

U.S. Provisional Patent Application No. 62/436,960, the entirety of which is incorporated herein by reference, discloses a cylindrical cargo container which overcomes many of the above-described drawbacks, and provides further advantages. FIGS. 1 to 3 show a cylindrical cargo trailer 100 as disclosed therein. The trailer has a container 110 mounted on and supported by a wheeled suspension 120. The container has a generally cylindrical shape, having a corresponding length along a longitudinal axis L of the container (shown in FIG. 2), and a generally circular cross-section characterized by a traverse width or diameter. The container 110 has a front end 130 and an rear end 140 oppositely disposed along the longitudinal axis of the container, and these may be configured in any desired manner, which may depend at least in part on an intended function of the trailer.

For example, if the trailer 100 is configured for use as a tanker trailer for liquefied loads, dry bulk cargo, or gases, then the front end 130 and the rear end 140 of the container may include a front wall 135 and an end wall (not shown), respectively, joined to and enclosing a cylindrical tube, and the container 110 may have means for loading and unloading the container, such as one or more closeable openings (not shown) at a side of the container, as is known in the field.

In other configurations, the container may have a front wall 135 at its front end, but at its rear end may instead have a rear opening 143 for loading and unloading cargo. A plane or face of the rear opening may have any desired configuration, and for example form any desired angle with a longitudinal axis of the trailer, which may be, for example, perpendicular or oblique.

The container 110 may have a tailgate 147 for closing the rear opening 143. The tailgate may be movably mounted at or adjacent a perimeter of the opening 143 in any convenient manner. For example, the tailgate 147 may be hingedly mounted, at or adjacent an edge of the tailgate, at or adjacent an upper edge of the opening, as shown in FIGS. 1 & 2, such that the tailgate 147 is openable by rotating the tailgate 147 upwardly using the hinges 360, and closeable by the opposite motion. Alternatively, the tailgate 147 may be hingedly mounted, at or adjacent an edge of the tailgate, at or adjacent a lateral edge, such as a right edge or left edge, of the opening such that the tailgate 147 is openable by rotating the tailgate 147 laterally, that is to one side, using the hinges, and closeable by the opposite motion. The container 110 may include an appropriate locking mechanism 325 selectively to maintain the tailgate 147 in a locked configuration or to permit the tailgate 147 to open. In this way, the tailgate 147 may be closed to retain cargo in the container 110, and opened to permit loading or discharge of cargo to or from the container 110.

In particular, in some embodiments the trailer 100 may be configured as a tipper trailer, having the tailgate 147 mounted at or adjacent the upper edge of the opening 143. When the trailer is tipped in a manner known in the art, the tailgate 147 may be configured to swing open under its own weight to open the rear opening 143 and to permit discharge of cargo from the container 110. When the locking mechanism 325 of the tailgate 147 is in the locked configuration the tailgate 147 is kept closed, while in the unlocked configuration the tailgate 147 is allowed to open, including by swinging open as previously described. Such tipper trailers may be used to carry municipal or industrial waste, and may be configured to cooperate with tipping mechanisms located at waste landfills to tip the trailer 100 while the locking mechanism 325 is unlocked to discharge the waste from the trailer 100 into the landfill.

As shown in FIGS. 1 to 3, the container 110 may be formed of longitudinal extruded panels 150. As shown in FIG. 5, each panel may have an outer skin 152, an inner skin 154, and a plurality of webs 156 spanning the outer skin 152 and the inner skin 154. The panels 150 may be formed of any suitable material, which may be a metal, which may be steel or aluminum. The outer skin 152, the inner skin 154, and the webs 156 may have any respective dimensions. The following are non-limiting examples. The outer skin 152 may have a thickness of at least 1 mm, or from 1 mm to 4 mm, or from 2 mm to 3 mm, or about 2.5 mm. The inner skin 154 may have a thickness of at least 2 mm, or from 2 mm to 5 mm, or from 3 mm to 4 mm, or about 3.5 mm. The webs 156 may each have a thickness 154 may have a thickness of at least 1 mm, or from 1 mm to 4 mm, or from 2 mm to 3 mm, or about 2.5 mm. The outer skin 152 and the inner skin 154 may be spaced by a gap of at least 30 mm, or from 30 mm to 45 mm, or from 35 mm to 40 mm, or about 38 mm. The webs 156 may be provided in any desired number, which may be at least 6, or 6 to 12, or 8 to 10, or about 9. The webs 156 may be spaced by a gap or at least 15 mm, or 15 mm to 35 mm, or 20 mm to 30 mm, or about 25 mm. Other configurations are possible.

In order to form, when assembled, the cylindrical tube of the container 110 having a circular cross-section, as shown particularly in FIG. 4, each panel 150 may be extruded having a cross-section generally arcuate in shape, as shown particularly in FIG. 5, which for all of the panels 150 may have a common arc radius R, or degree of curvature, as shown in FIG. 4. The panels 150 may all have the same arc length S, as shown in FIG. 4, or some of the panels 150 may have a different arc length S from other ones of the panels. Any suitable combination is possible. As shown particular in FIG. 5, each panel 150 may be extruded with a tongue 158 at a first edge at one end of the arc and a groove 159 at an opposite edge at an opposite end of the arc. The tongues 158 and grooves 159 of the different panels 150 may be configured with respective sizes and shapes to couple fittingly. In this way, a plurality of the panels 150 may be joined at abutting edges by mating the tongue 158 of one panel 150 with the groove 159 of an abutting panel 150 to form a joint 160, and as shown particularly in FIG. 4 multiple panels may be so joined in sequence to form the cylindrical tube. Each of the joints 160 so formed may be cemented or affixed by any suitable means, which may include fasteners or welds. The panels 150 may be of any desired length, which may include a length which bridges the front end 130, which may include the front wall 135, and the rear end 140, which may include an end wall (not shown) or the rear opening 143, as the case may be—in other words, the entire length of the container 110. All of the panels 150 may have the same length, or first ones of the panels 150 may have a first length different from a second length of second ones of the panels 150. Further combinations are possible.

As shown particularly in FIG. 6, some of the panels 150 may include panels 151 extruded with a profile including one or more projections configured for selected purposes. For example, and as shown in FIG. 4 one or more, which may be two, of the panels 151 may be extruded with longitudinal rails 170 or flanges to be coupled to a chassis 122 of the wheeled suspension 120, for example by fasteners or welds, for mounting the container 110 to the wheeled suspension 120. In such case, the profiles, include the two profiles, may be configured in such a way that the mounting rails 170 or flanges are positioned and shaped in such a way that is generally symmetrical relative to a vertical plane extending longitudinally and intersecting a center of the circular cross-section of the container 110, as shown particularly in FIG. 4. Such mounting rails 170 may also be configured, sized, and shaped to provide structural strength to the container 110. Other projections may instead or also be included in the extrusion profile of one or more panels 150 for any desired purpose, for example for attachment of landing gear 124 or a fifth wheel, or hitch 126.

Where the panel 151 has a mounting rail 170, the outer skin 152, the inner skin 154, and/or one or more of the webs 156 of the panel 151 may be respectively formed with a greater thickness to provide additional strength and rigidity at or about the portion of the panel 151 adjoining the rail 170, so as better to communicate the weight of the container 110 and its contents to the rail 170 and thence to the wheeled suspension 120. The panel 151 may be formed with its outer skin 152, inner skin 154, and/or webs 156 having respective thicknesses which are uniformly greater relative to the corresponding thicknesses of other ones of the panels 150 not having the rail 170. Alternatively, the panel 151 may be formed such that the respective thicknesses of its outer skin 152 and/or inner skin 154 are generally similar to those of neighbouring panels 150 where the panel 151 adjoins neighbouring panels 150, i.e. at or about its tongue 158 and groove 159, but where the respective thicknesses of its outer skin 152 and/or inner skin 154 grow approaching the portion of the panel 151 which is adjacent to and/or adjoins the rail 170. Similarly, the webs 156 of the panel 151 in the portion of the panel 151 which is adjacent to and/or adjoins the rail 170 may have a thickness which is relatively greater than a thickness of the remaining webs 156 of the panel 151, where the thickness of such remaining webs may be substantially similar to the webs 156 of the other panels 150 not having the rail 170. As with the outer skin 152 and the inner skin 154 of the panel 151, the webs 156 may grow in thickness approaching the portion of the panel 151 which is adjacent to and/or adjoins the rail 170.

The longitudinal panels 150 so provided, assembled, joined, and affixed, to form the cylindrical tube of the container 110, may be configured to function as structural members, and provide each panel 150, and the assembled container 110 as a whole, with structural strength and rigidity both along and transverse the longitudinal axis L of the container. As such, no further reinforcing means may be required, such as annular bands or ribs required by conventional cylindrical containers.

Moreover, due to the lack of any need for such additional structural members, both the inside and the outside surfaces of the container 110 may be made completely smooth, without or with minimal projections. With respect to the outside surface of the container 110, this provides the container with an optimal aerodynamic profile. With respect to the inside surface of the container 110, this completely or maximally reduces the catching, or snagging, or other such impediment to movement of the cargo within the container 110 along the inside surface, thereby facilitating loading and unloading of cargo from the container 110.

Depending upon the intended use of the container 110, the particular configuration of the panels provides yet further advantages.

For example, when the trailer 100 is configured as a tanker trailer for liquefied loads, dry bulk cargo, or gases, the outside skin 152 of the panels 150 may provide protection against impact or puncture from a collision or other blow coming from outside of the container 110. In such case, the blow may cause a rupture in the outer skin 152 of a panel 150, but nevertheless the inner skin 154 may remain intact and its structural integrity unaffected or minimally affected by the presence of the rupture in the outer skin 152.

A similar advantage may be realized when the trailer 100 is configured for the transport of waste, such as municipal or industrial garbage. One issue related to the transport of such waste is that it typically exudes leachate, being liquid which has passed through or about the solid waste and which has extracted soluble or suspended solids. It is desirable to avoid the release of leachate in an uncontrolled manner, as it is regarded to be an environmental hazard. It is desirable, therefore, to ensure that it is not released during transport. Municipal or industrial waste typically includes hard objects, however, which may puncture a surface of a container upon impact. In such case, the present cylindrical container 110, by virtue of the panels 150 having both an inner skin 154 and an outer skin 152, may provide a means of prevention of discharge of leachate, inasmuch as the release of any leachate following puncture of the inner skin 154, for example by impact with hard objects contained in the waste, may be contained by the outer skin 152. Moreover, the webs 156 of the panel 150 may provide one or more channels which limit movement of the leachate.

While the above description relates to a cylindrical trailer, the same principles are applicable to a cylindrical container mounted to a unitary chassis with a truck, as is done in a tanker truck, or alternatively as a tanker railcar. The size and configuration of the cylindrical container may be selected for mounting on the chassis of a tanker truck or tanker railcar, as appropriate.

With reference to FIGS. 5 & 6, the container 110 of FIGS. 1 to 3 may include a plurality of longitudinal channels 180 formed in the wall of the container 110, in particular formed by the inner skin 154, outer skin 152, and webs 156 of the extruded panels 150. Such longitudinal channels 180 may extend a part or an entirety of the length of the container 110. For at least one of the channels 180, the container 110 may have an inlet (not shown) at one end of the channel 180 and an outlet (not shown) at an opposite end of the channel 180. The channel 180 may be used to carry fluid fed into the inlet and drained from the outlet. A number of the channels 180 may be so configured. A feed manifold (not shown) may be coupled to the inlets, either by direct, rigid couplings or pipes, or by a corresponding number of flexible hoses. The trailer 100 may have a fluid supply apparatus (not shown), which may include a pump (not shown) to pump fluid to the inlet manifold and from there to the channels. A return manifold (not shown) may be coupled to the channel outlets, either by direct, rigid couplings or pipes (not shown), or by a corresponding number of flexible hoses, to return spent fluid to the fluid supply apparatus.

The fluid supply apparatus may include a fluid heating device (not shown) to heat the fluid. In this way, heated fluid may be pumped into the wall of the container 110 to warm the container wall, and circulate back to the fluid heating device to be reheated. Such a configuration may be useful when the container forms part of a truck, trailer, or railcar used in a cold climate, and it is desired to prevent or reduce freezing or sticking of the contents of the container to an inside surface of the container due to the cold temperatures. Similarly, the fluid supply apparatus may include a fluid cooling device (not shown) to cool the fluid. In this way, cooled fluid may be pumped into the container walls channels to cool the container wall, and circulate back to the fluid cooling device to be re-cooled. In this way the fluid supply apparatus may be used to cool the contents of the container. The fluid heating device or fluid cooling device may include a pump to pump the fluid through the channels and supply pipes, hoses, and/or manifold, and may be connected to be powered by an engine of a truck to which the trailer is hitched, or the container is mounted, or a locomotive for pulling a railcar.

The fluid supply apparatus with fluid heating device may be substantially similar to the teaching of U.S. Pat. No. 8,662,405, the entirety of which is incorporated herein by reference, and for example may include the feed manifold, hot fluid source, valves, pipes, return manifold, and return pipe disclosed therein. Similarly, the channel inlets and outlets may include holes and plugs for feeding and emptying the fluid. The teachings of U.S. Pat. No. 8,662,405 may be adapted to provide a cooled liquid, instead of a heated liquid, for a container adapted to cool its contents, as described above.

Alternatively, the channels formed in the container wall may be filled with insulation. The channels may also be used to run electrical or plumbing lines along the length of the container, and may be configured with plastic liners, with appropriate inlets and outlets for passage of the electrical or plumbing lines into or out of the channels.

The truck, trailer, or railcar may be used with a compactor, for example to compact municipal or industrial waste in the container as it is loaded. While the use of conventional rectangular, box-shaped containers to receive, compact, and transport waste is well-known and widespread, the use of cylindrical containers for this purpose is unknown for the reasons given above, namely that cylindrical containers of conventional construction which are sufficiently rigid to withstand the force of compaction are too heavy for economical use for waste transport. The disclosed cylindrical trailers, formed of extruded panels, solve this problem. Moreover, such cylindrical trailers possess a material advance over conventional rectangular trailers for use in waste transport specifically in relation to the process of compaction. One problem routinely experienced during compaction of waste in rectangular trailers is that the waste often develops outward pressure in all directions, including against the inward faces of the sidewalls of the container, resulting in outward bulging or bowing of the sidewalls. As a result, the sidewalls must typically be constructed to withstand greater pressure, leading to increase materials requirements, container weight, and cost. With a cylindrical container, however, this outward force is evenly distributed about the circumference of the circular cross-section of the container thereby avoiding such problematic bulging and moreover avoiding enabling lighter construction. Another problem experienced in the use of rectangular containers for compaction and transport of waste is that it is common for waste to be pressed into and stuck in the corners formed by the rectangular shape of the box. Additional time and effort, or extra measures, are often required to remove this stuck waste when the trailer is tipped for removal of the waste. The disclosed cylindrical trailer lacks such corners, however, and thus removal of waste by tipping or otherwise is facilitated.

A cylindrical container for a truck, trailer, or railcar as disclosed in U.S. Provisional Patent Application No. 62/436, 960 has numerous further advantages. It may be made smooth inside and outside, with optimal aerodynamics. Compared to traditional tanker containers it may also have reduced weight. Both of these advantages may result in better fuel economy. The extruded panels, having inner and outer skins, may provide impact protection from without, and as well content retention protection from within, in the event of puncturing impacts. It may be straightforward and cost-effective to provide linear items, such as rails for mounting to the chassis, or for mounting landing gear or a hitch, by including them in the extrusion profile of one or more of the panels.

While the container, tanker truck, trailer, and railcar disclosed in U.S. Provisional Patent Application No. 62/436, 960 overcomes many of the drawbacks and provides further advantages over prior teachings, there remains a need for efficient and reliable methods of manufacturing cylindrical cargo containers formed of longitudinal curved panels.

BRIEF DESCRIPTION OF THE DRAWINGS

Embodiments will now be described, by way of example only, with reference to the attached Figures.

FIG. 10 shows a perspective view of a cylindrical shell formed of curved panels encompassed by a plurality of collars.

FIG. 13A shows a detail view illustrating formation of a tongue-and-groove joint of panels assembled to form the first semi-cylindrical shell.

Figure 1:
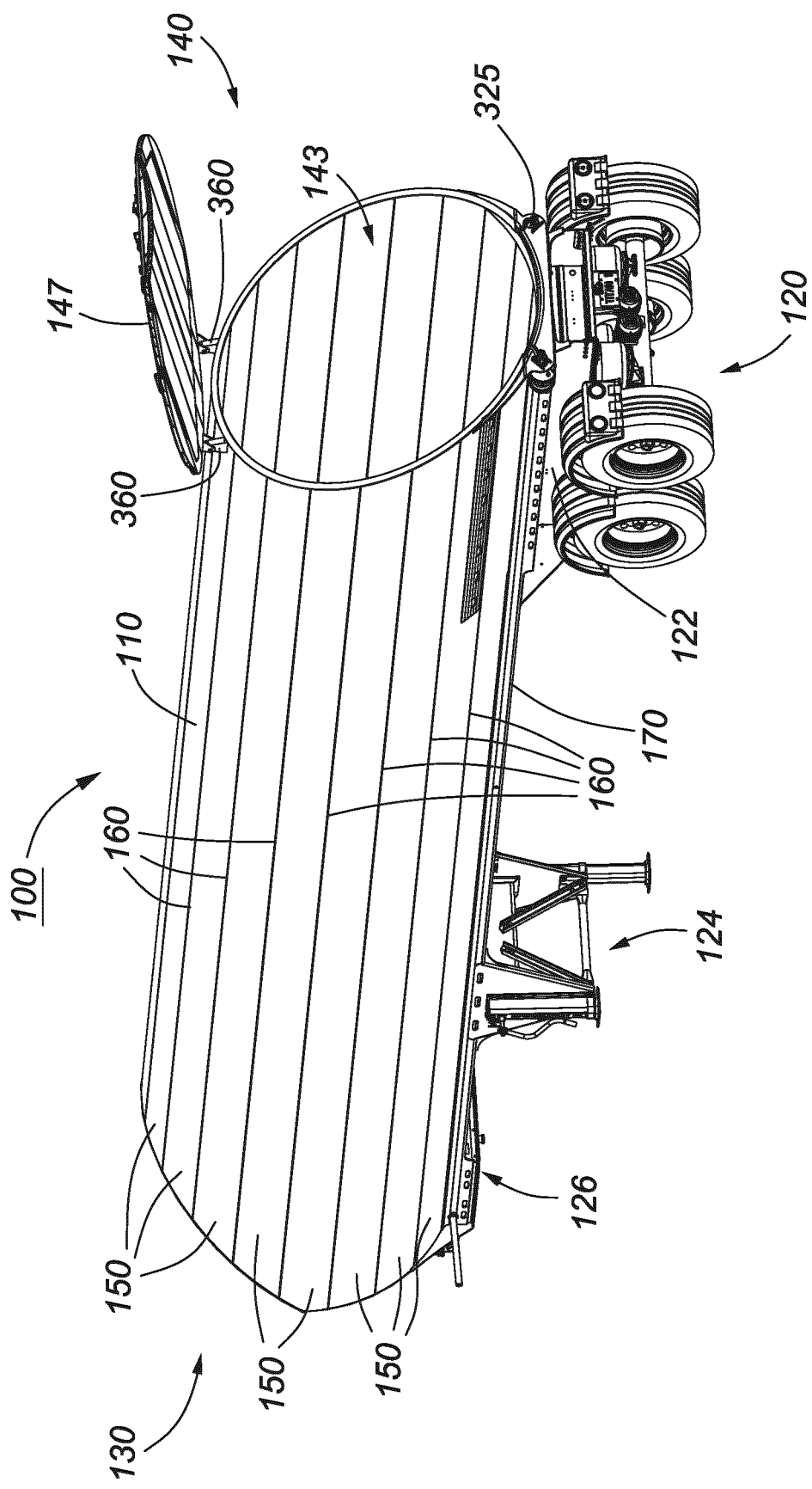
FIG. 1 shows a first perspective view of a previous cylindrical cargo trailer having a container formed of longitudinal extruded panels.
Figure 2:
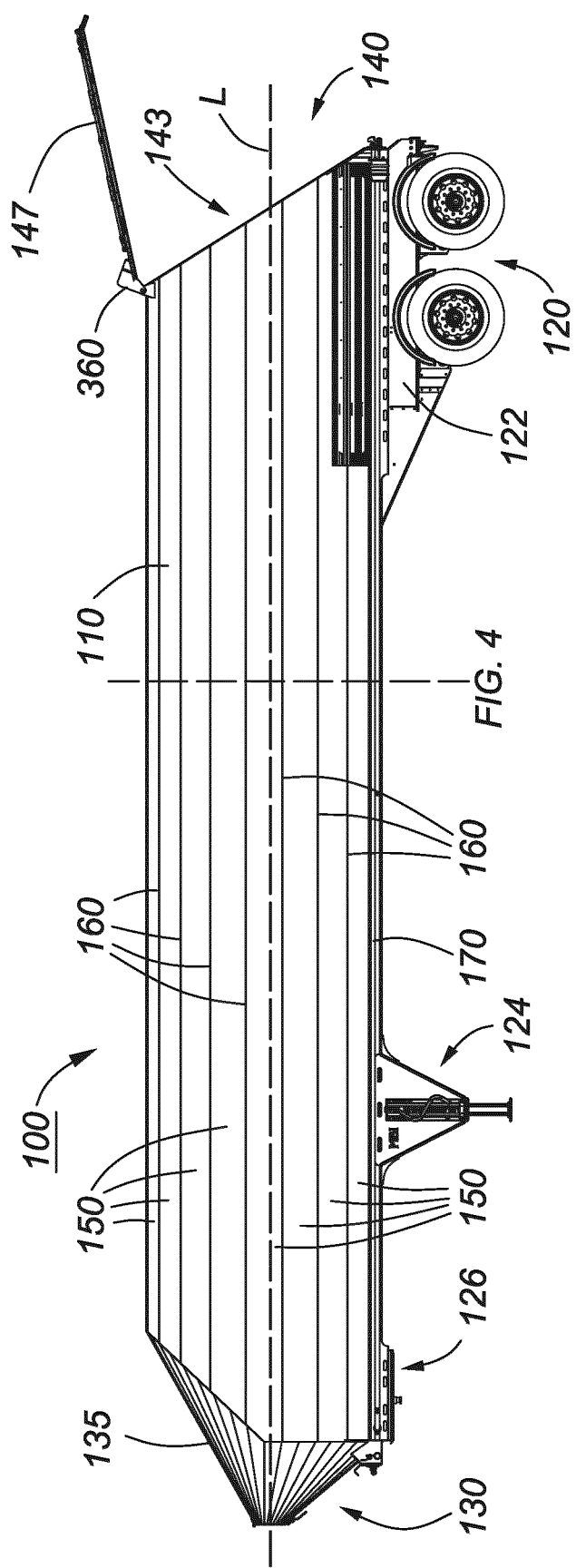
FIG. 2 shows a side view of the previous cylindrical cargo trailer of FIG. 1.
Figure 3:
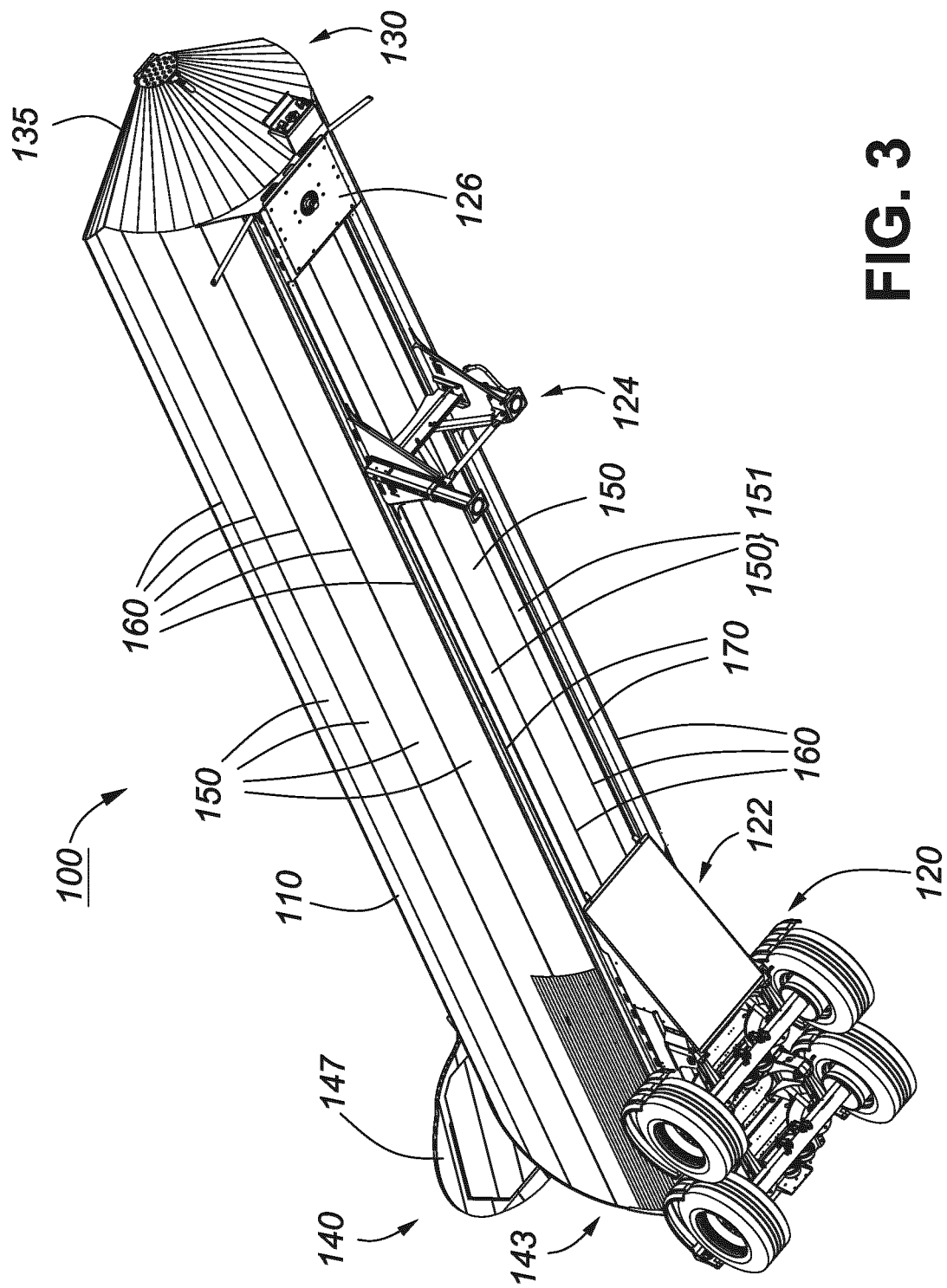
FIG. 3 shows a second perspective view of the previous cylindrical cargo trailer of FIG. 1.
Figure 4:
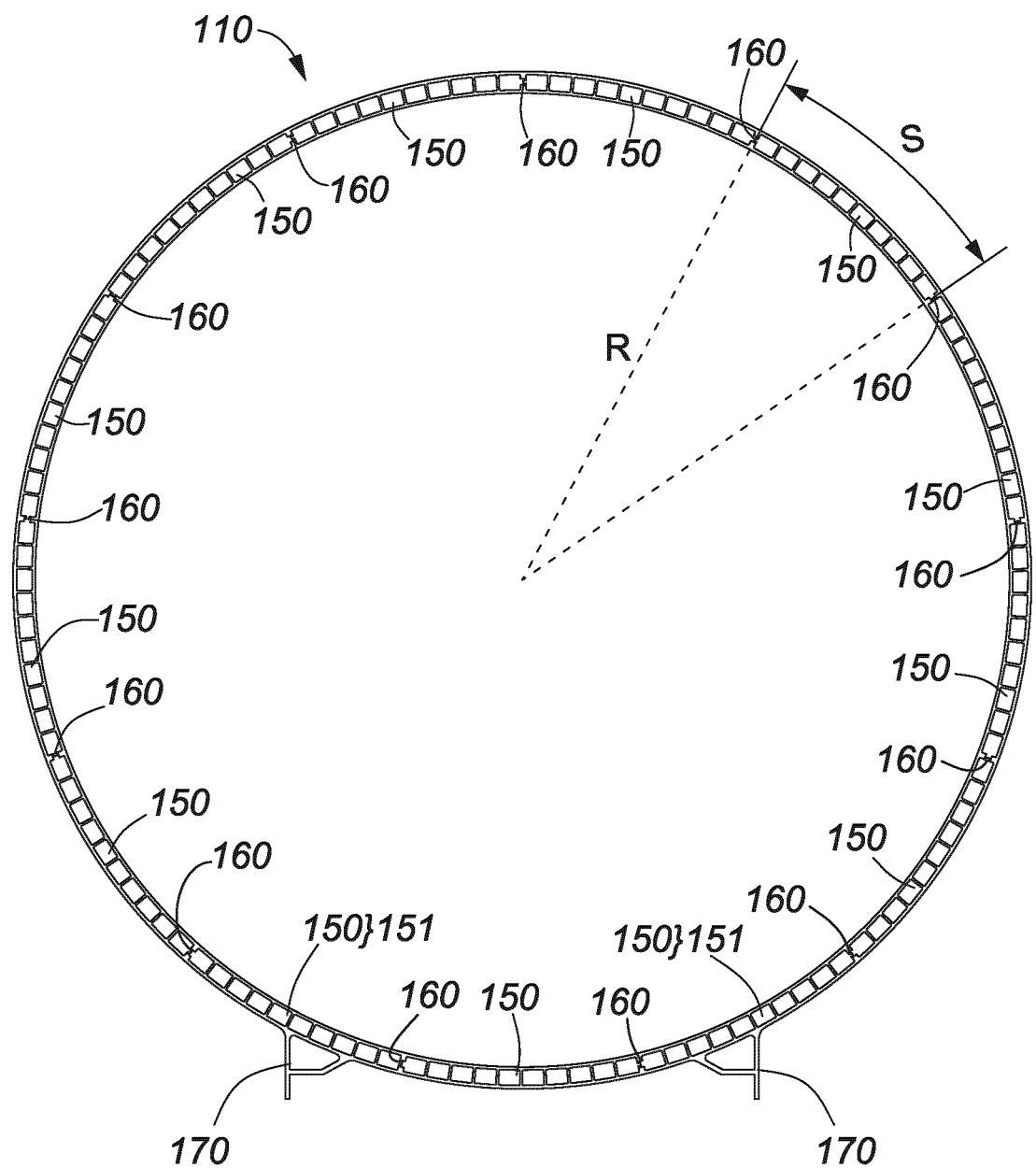
FIG. 4 shows a cross-sectional view of a container of the previous cylindrical cargo trailer of FIG. 1.
Figure 5:
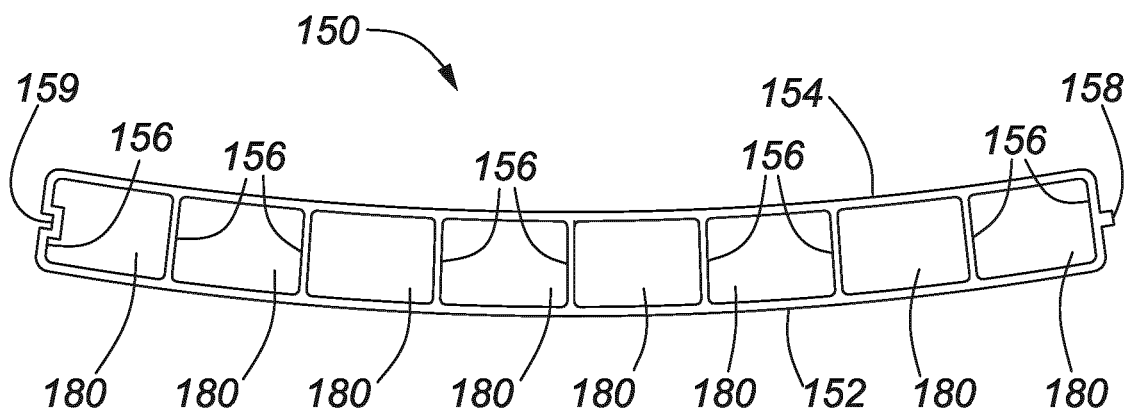
FIG. 5 is a cross-sectional view of a single longitudinal extruded panel of the previous cylindrical cargo trailer of FIG. 1.
Figure 6:
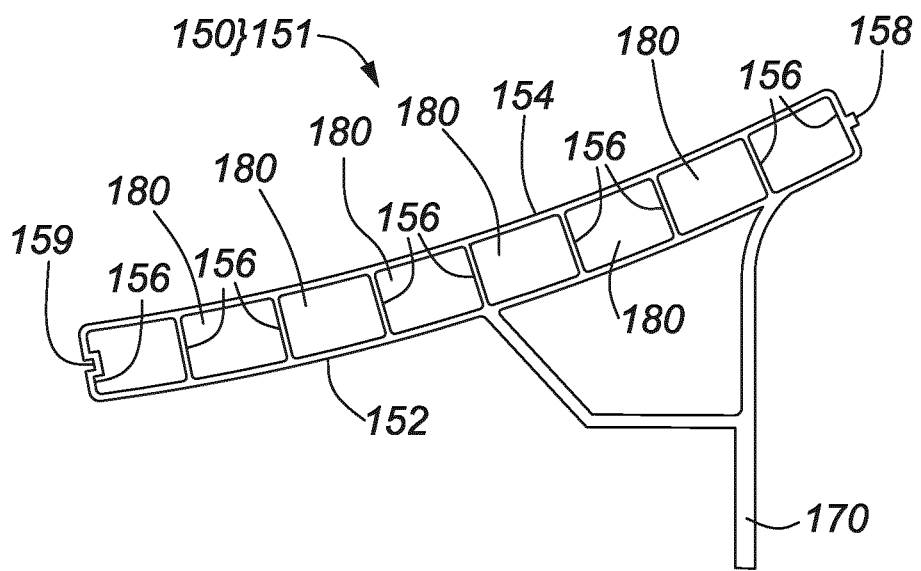
FIG. 6 is a cross-sectional view of a single longitudinal extruded panel having an integral extrusion providing a longitudinal rail or flange to be coupled to a chassis of a wheeled suspension, of the previous cylindrical cargo trailer of FIG. 1.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DESCRIPTION

A method of manufacturing a cylindrical cargo container, and an apparatus for performing the method, are disclosed herein.

Figure 7:
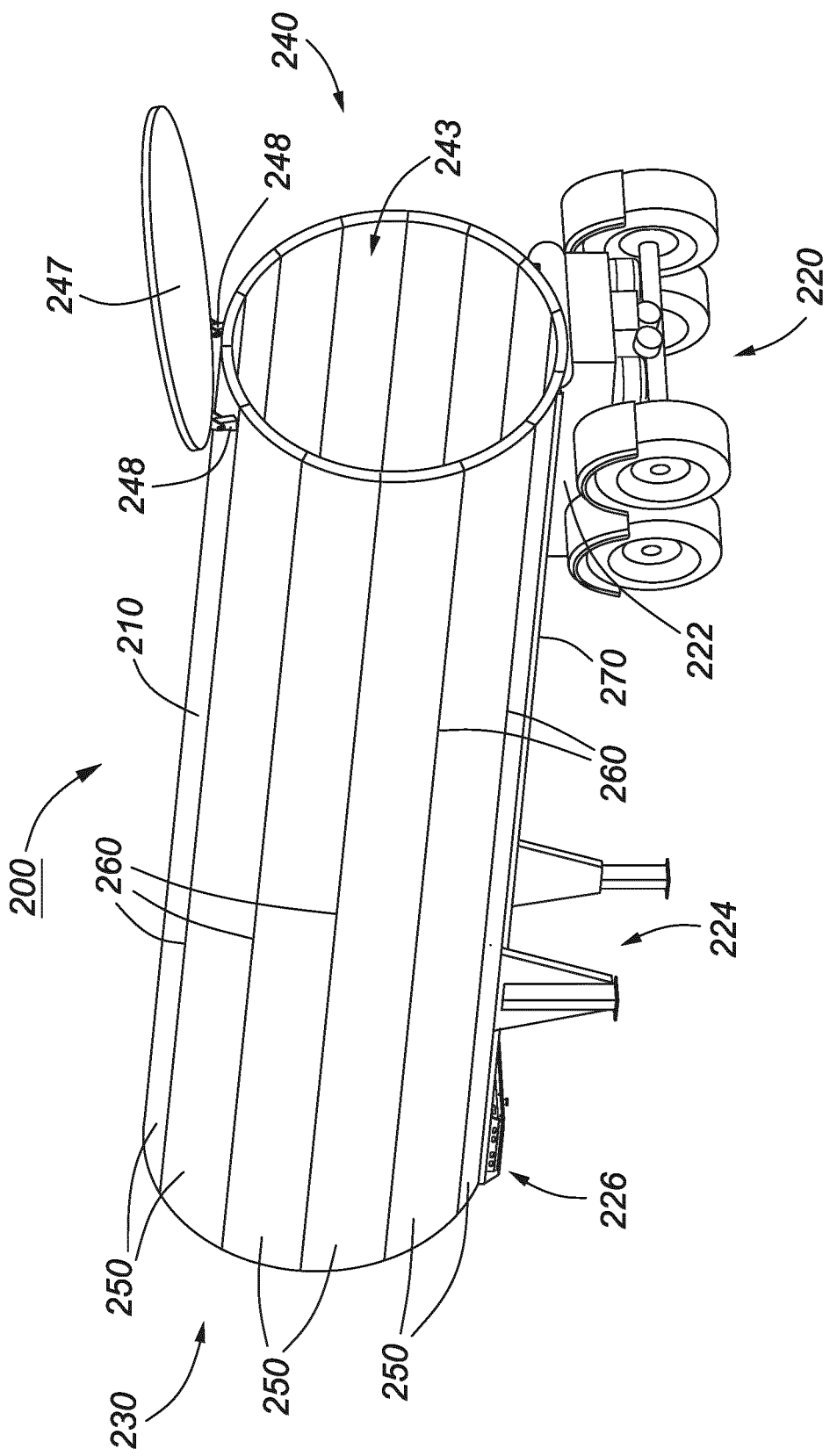
FIG. 7 shows a perspective view of a cylindrical cargo trailer having a cylindrical container formed of longitudinal curved panels.
Figure 8:
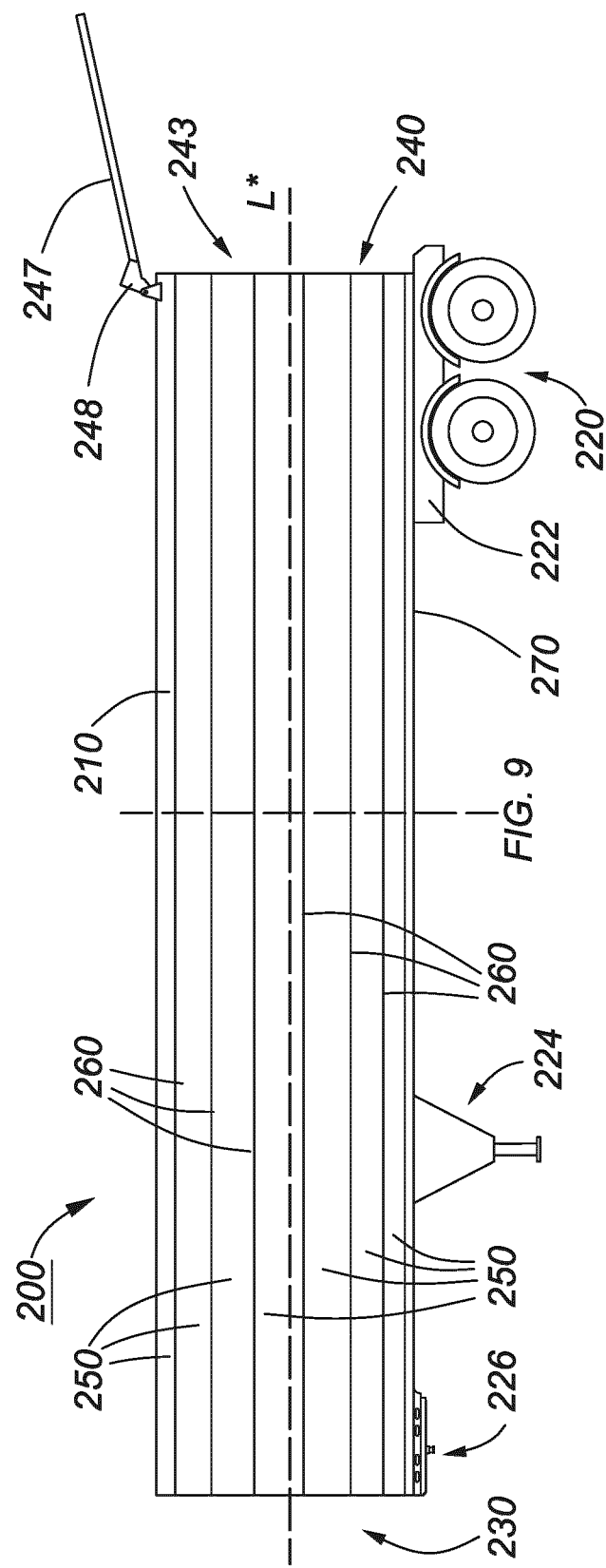
FIG. 8 shows a side view of the cylindrical cargo trailer of FIG. 7.

FIGS. 7 & 8 show a cylindrical cargo trailer 200. The trailer 200 has a container 210 mounted on and supported by a wheeled suspension 220. The container 210 has a generally cylindrical shape, having a corresponding length along a longitudinal axis L* of the container (shown in FIG. 8), and a generally circular cross-section characterized by a traverse width or diameter. The container 210 has a front end 230 and an rear end 240 oppositely disposed along the longitudinal axis L* of the container 210, and these may be configured in any desired manner, which may depend at least in part on an intended function of the trailer.

The container 210 may have a tailgate 247 for closing the rear opening 243. The tailgate 247 may be movably mounted at or adjacent a perimeter of the opening 243 in any convenient manner. For example, the tailgate 247 may be hingedly mounted, at or adjacent an edge of the tailgate, at or adjacent an upper edge of the opening, such that the tailgate 247 is openable by rotating the tailgate 247 upwardly using the hinges 248, and closeable by the opposite motion. Alternatively, the tailgate 247 may be hingedly mounted, at or adjacent an edge of the tailgate, at or adjacent a lateral edge, such as a right edge or left edge, of the opening such that the tailgate 247 is openable by rotating the tailgate 247 laterally, that is to one side, using the hinges, and closeable by the opposite motion. The container 210 may include an appropriate locking mechanism selectively to maintain the tailgate 247 in a locked configuration or to permit the tailgate 247 to open. In this way, the tailgate 247 may be closed to retain cargo in the container 210, and opened to permit loading or discharge of cargo to or from the container 210

The container 210 may be formed of longitudinal curved panels 250. The panels 250 may be formed of a continuous thickness of resilient plate material and shaped, which may be by bending, extrusion, rolling, or any other suitable technique, to provide the longitudinal curved panels 250 with a common curvature. The panels 250 may be formed of any suitable material, which may be a metal, which may be steel or aluminum, and have any suitable dimensions including thickness. The following are non-limited examples. In some embodiments, the panels 250 have a thickness of between 0.5" and 6" (1.27 cm and 15.24 cm), or between 1" and 4" (2.54 cm and 10.16 cm), or about 1.5" (3.81 cm).

Other materials and manufacturing techniques are possible, and the principles disclosed herein are not necessarily limited to any particular materials or manufacturing techniques to produce the panels. For example, the principles disclosed herein may be applicable where the panels are formed of non-metals including plastics, for example thermoplastics, including for example high density polyethylene, or fiberglass. So long as the panels are sufficiently rigid and strong in view of the principles disclosed herein, any and all different materials, dimensions, and manufacturing techniques are possible.

Figure 9:
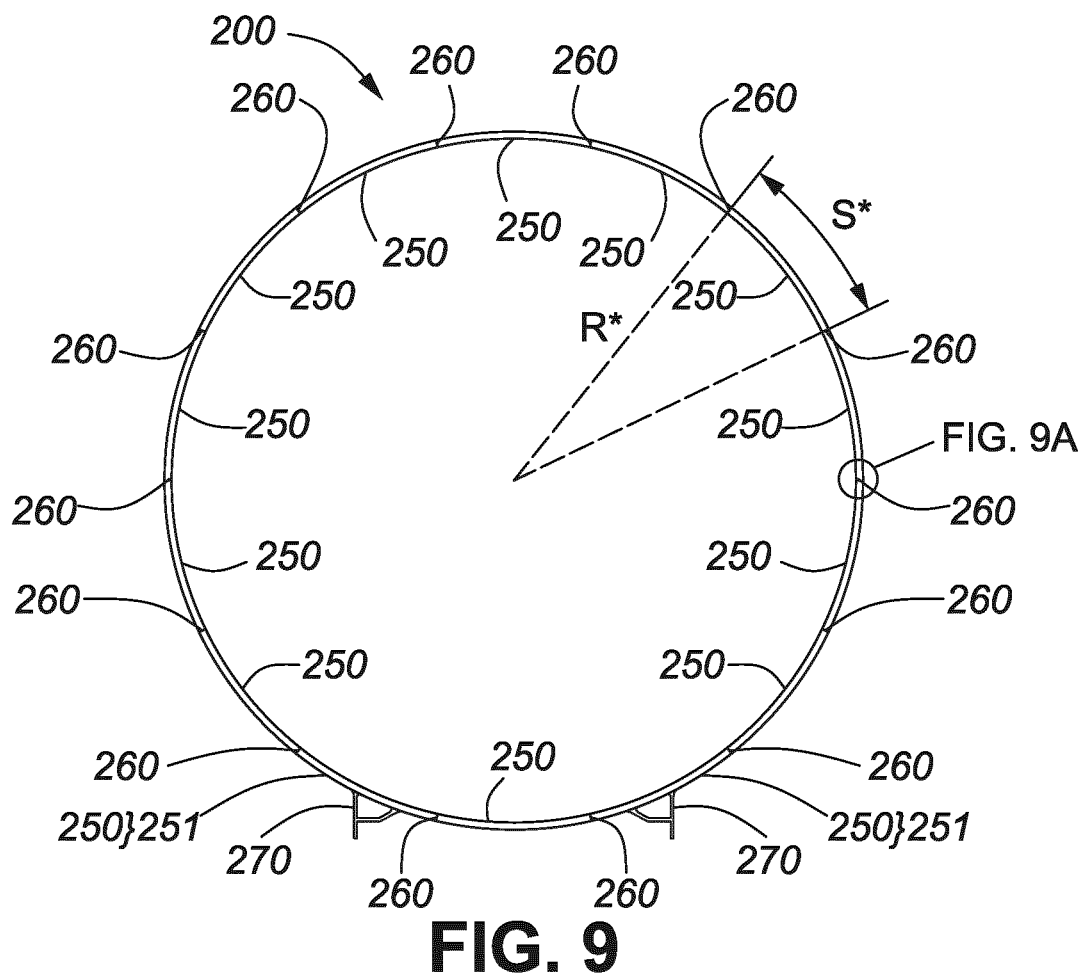
FIG. 9 shows a cross-sectional view of the cylindrical container of the cylindrical cargo trailer of FIG. 7.

In order to form, when assembled, the cylindrical tube of the container 210 having a circular cross-section, as shown particularly in FIG. 9, each panel 250 may have a cross-section generally arcuate in shape, which for all of the panels 250 may have a common arc radius R*, or degree of curvature. The panels 250 may all have the same arc length S*, or some of the panels 250 may have a different arc length S* from other ones of the panels 250. Any suitable combination is possible. The following are non-limiting examples. In some embodiments, the panels 250 have an arc radius R* of between 2.5' and 6' (0.762 m and 1.8288 m), or between 3.5' and 5' (1.0668 m and 1.524 m), or about 51" (1.2954 m). In some embodiments, the panels 250 have an arc length S* of between 10" and 32" (25.4 cm and 81.28 cm), or between 18" and 26" (45.72 cm and 66.04 cm), or about 22" (55.88 cm).

Figure 9A:
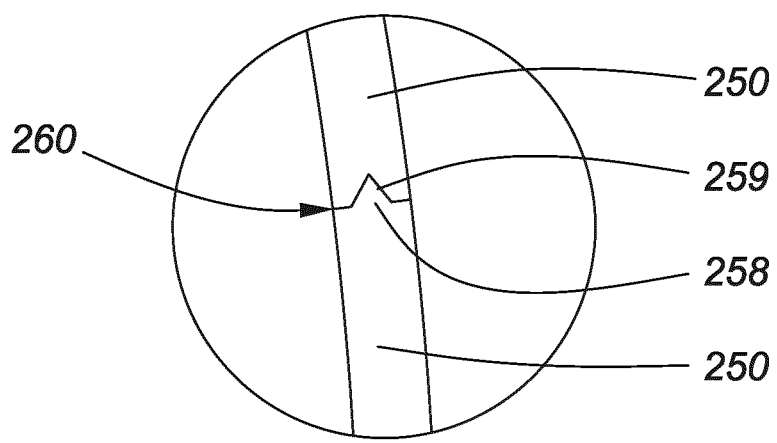
FIG. 9A shows a detail view of a tongue-and-groove joint of curved panels forming the cylindrical container.

As shown particularly in FIG. 9A, each panel 250 may be formed with a tongue 258 at a first edge at one end of the arc and a groove 259 at an opposite edge at an opposite end of the arc. The tongues 258 and grooves 259 of the different panels 250 may be configured with respective sizes and shapes to couple fittingly. In this way, a plurality of the panels 250 may be joined at abutting edges by mating the tongue 258 of one panel 250 with the groove 259 of an abutting panel 250 to form a joint 260, and as shown particularly in FIG. 9 multiple panels may be so joined in sequence to form the cylindrical tube. Each of the joints 260 so formed may be cemented or affixed by any suitable means, which may include fasteners or welds. Other mating means or techniques are possible. For example, instead of a tongue-and-groove arrangement, the edge of one adjacent panel may be rounded with a preconfigured convex curvature, and the edge of the mating adjacent panel may be rounded with a preconfigured concave curvature matching the convex curvature, such that the first convex rounded edge abuts fittingly the second concave rounded edge. Other suitable mating arrangements may be used.

The panels 250 may be of any desired length, which may include a length which bridges the front end 230 and the rear end 240 of the container 210—in other words, the entire length of the container 210. All of the panels 250 may have the same length, or first ones of the panels 250 may have a first length different from a second length of second ones of the panels 250. Further combinations are possible. The following are non-limiting examples. In some embodiments, the panels 250 have a length of between 20' and 100' (6.096 m and 30.48 m), or between 40' and 80' (12.192 m and 24.384 m), or between 50' and 60' (15.24 m and 18.288 m), or about 56' (17.0688 m), or about 53' (16.1544 m).

As shown particularly in FIG. 9, some of the panels 250 may include panels 251 formed with a profile including one or more projections configured for selected purposes. For example, and as shown in FIG. 9 one or more, which may be two, of the panels 251 may be formed with longitudinal rails 270 or flanges to be coupled to a chassis 222 of the wheeled suspension 220, for example by fasteners or welds, for mounting the container 210 to the wheeled suspension 220. In such case, the profiles, include the two profiles, may be configured in such a way that the mounting rails 270 or flanges are positioned and shaped in such a way that is generally symmetrical relative to a vertical plane longitudinally bisecting the container 210, as shown particularly in FIG. 9. Such mounting rails 270 may also be configured, sized, and shaped to provide structural strength to the container 210. Other projections may instead or also be included in the extrusion profile of one or more panels 250 for any desired purpose, for example for attachment of landing gear 224 or a fifth wheel, or hitch 226.

As indicated above, the trailer 200 and container 210 may be embodied as a trailer 100 and container 110, respectively, as described in U.S. Provisional Patent Application No. 62/436,960, and as described above and shown in FIGS. 1-6. In particular, one or more of the wheeled suspension 220, front end 230, rear end 240, longitudinal axis L*, longitudinal curved panels 250, common arc radius R*, arc length S*, tongue 258, groove 259, joints 260, panels 251, longitudinal rails 270, landing gear 224, hitch 226, tailgate 247, rear opening 243, and hinges 248 may be embodied as the wheeled suspension 120, front end 130, rear end 140, longitudinal axis L, longitudinal extruded panels 250, common arc radius R, arc length S, tongue 158, groove 159, joints 160, panels 151, longitudinal rails 170, landing gear 124, hitch 126, tailgate 147, rear opening 143, and hinges 360, respectively. Moreover, at least some of the various properties and advantages described above as being possessed by the trailer 100 and/or container 110 may likewise be possessed by the trailer 200 and/or container 210.

As noted above, the above-described cylindrical cargo container 110 possesses numerous advantages over previous cylindrical cargo containers. There is further material value in an efficient and reliable method 300 of manufacturing such a cylindrical cargo container 110, as shown in FIGS. 10-23.

The method 300 includes providing a plurality of rigid panels 400 together formable into a cylindrical shell 405 (step 305). A first semi-cylindrical shell 410 is formed from panels 415 of a first set of the panels 400 (step 310), a second semi-cylindrical shell 420 is formed from panels 425 of a second set of the panels 400 (step 315), and the cylindrical shell 405 is formed from the first semi-cylindrical shell 410 and the second semi-cylindrical shell 420 (step 320). One or more collars 430 are formed which conformably encircle the cylindrical shell 405 (step 325). The collars 430 are constricted to compress joints 435 formed at abutting edges of pairs of adjacent panels 400 (step 330). The cylindrical shell 405 and collars 430 are then rolled about a longitudinal axis of the cylindrical shell 405 to bring respective joints 435 of pairs of panels 400 to a lower position 440, and an inside seam 445 of the joint 435 is welded when at the lower position 440 to form a welded inside seam 446 (step 335). The collars 430 are removed (step 340), and the cylindrical shell 405 is rolled about the longitudinal axis of the cylindrical shell 405 to bring respective joints 435 of pairs of panels 400 to an upper position 450, and an outside seam 455 of the joint 435 is welded when at the upper position 450 to form a welded outside seam 456 (step 345).

The cylindrical shell 405 may constitute container 210, the panels 400 may be the longitudinal curved panels 250, and each panel 400 may include an oblong cylinder segment of the cylindrical shell 405. Herein, "cylinder segment" includes a portion of a cylinder bounded by a secant plane parallel to the longitudinal axis of the cylinder. In addition, "cylindrical shell" includes a 3D annulus, being a projection of a 2D annulus along the axis of rotational symmetry of the 3D annulus—or, in other words, a hollow cylinder, or tube. One or more of the panels 400 may be panels 401, which may be panels 251, formed with a profile including one or more projections. For example, one or more, which may be two, of the panels 401 may be formed with longitudinal rails 457 or flanges to be coupled to a chassis 222 of the wheeled suspension 220, for example by fasteners or welds, for mounting the container cylindrical shell 405 to the wheeled suspension 220. Thus, these panels 401 may be panels 251, and the longitudinal rails 457 may be longitudinal rails 270.

Figure 11:
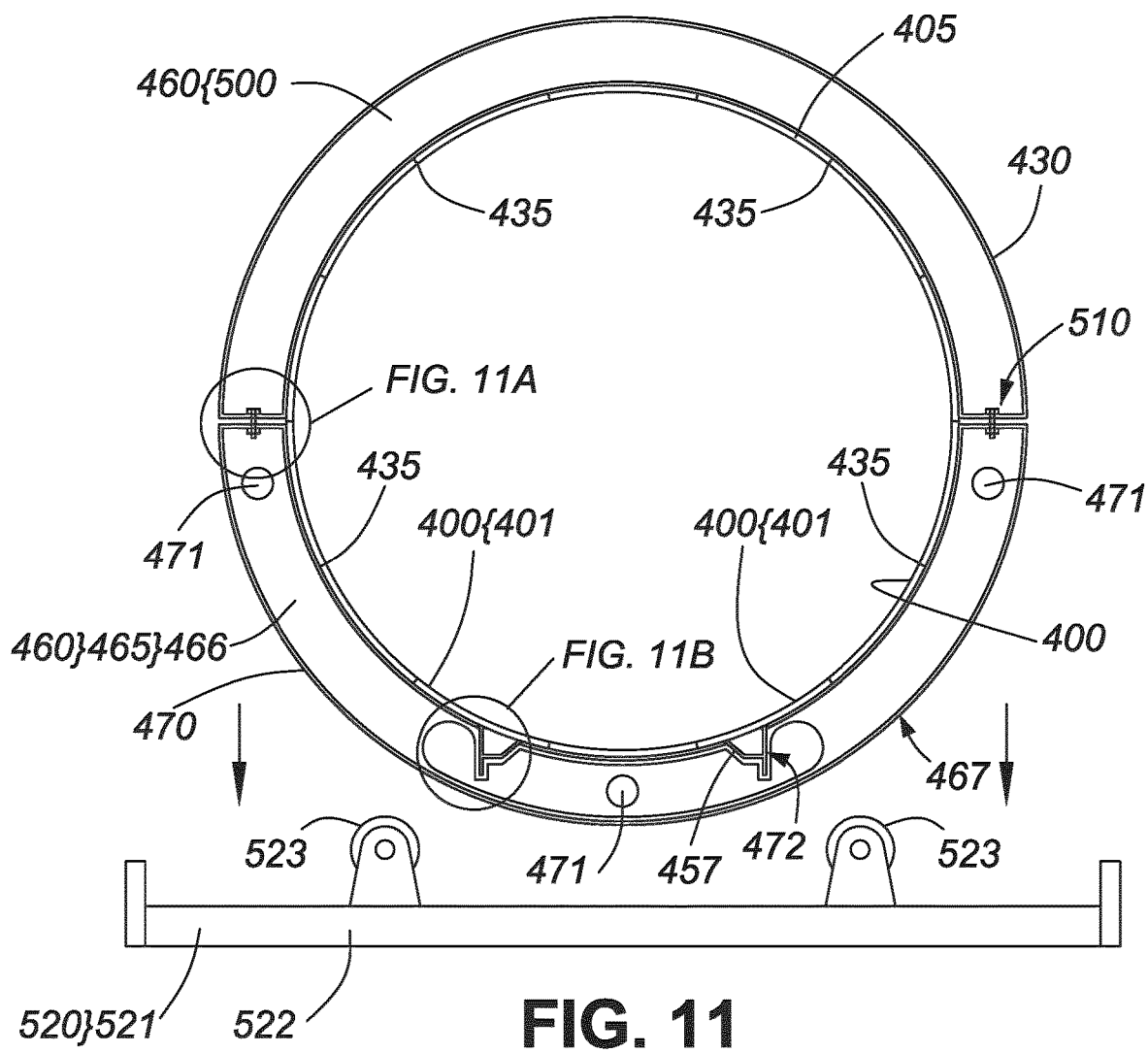
FIG. 11 shows a cross-sectional view of the cylindrical shell and collars of FIG. 10.

A plurality of pairs of ring segments 460 may be formable into collars 430 sized and shaped conformably to encircle the cylindrical shell 405, as best seen in FIGS. 10 & 11. Herein, "ring" includes an annular shape, and "ring segment" includes an angular portion of the annulus, or a portion of the annulus bound be a secant. An inside surface of the cylindrical shell 405 and an outside surface of the ring segments 460 may have, or be characterized by, a common curvature R*, such that the collars 430 fittingly encircle the cylindrical shell 405. Each of the ring segments may be formed of any suitable material of sufficient durability, rigidity, and strength, including in some embodiments steel or stainless steel.

Figure 12:
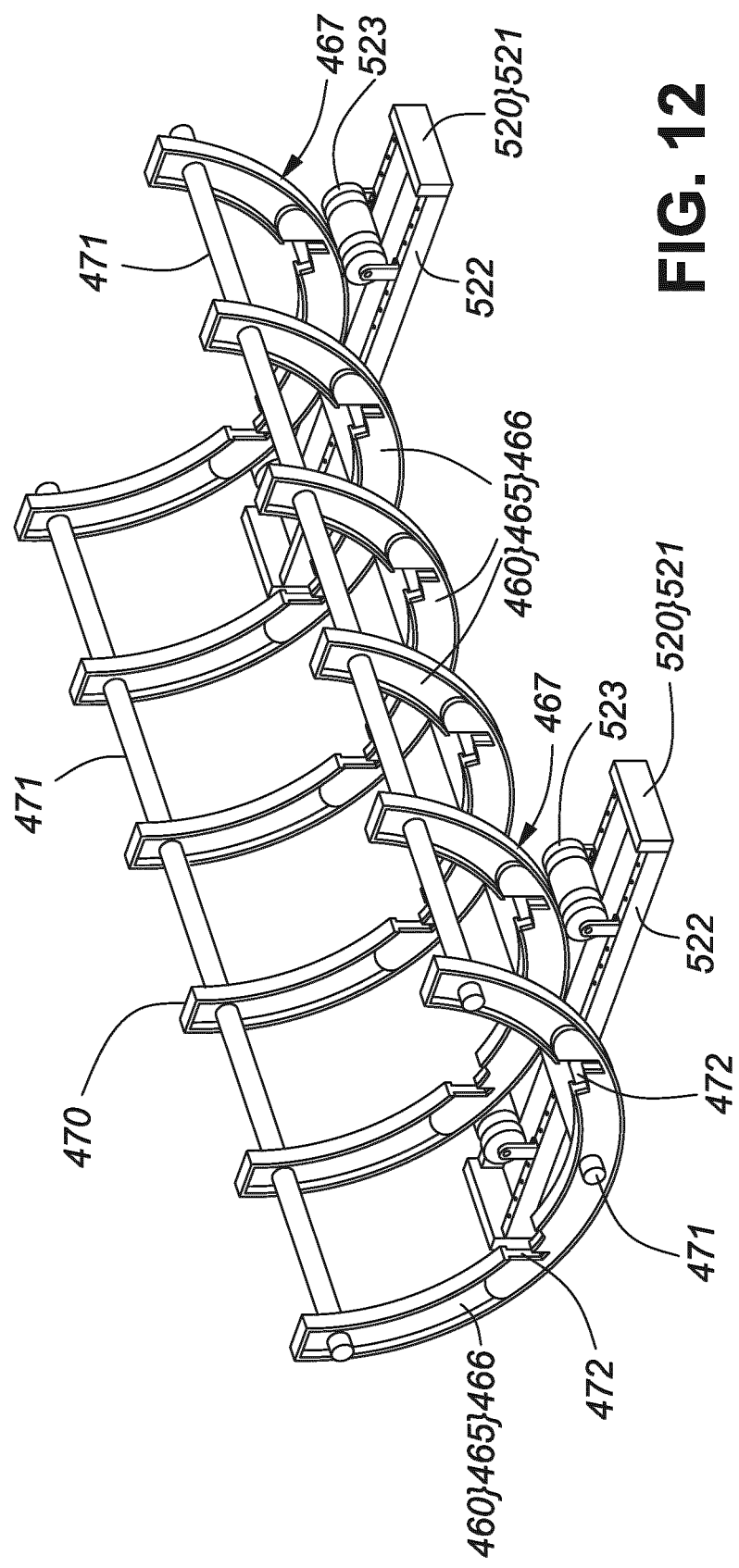
FIG. 12 shows a perspective view of a cradle formed of a set of ring segments resting on tank rollers.

As best seen in FIG. 12, a first set of the ring segments 460 may be ring segments 465 which form a cradle 470, wherein the ring segments 465 are longitudinally spaced and aligned concentrically to form a semi-cylindrical frame conformable to the cylindrical shell 405. By "aligned concentrically", it is meant that the respective circular axes of rotation of the ring segments 465, being the circular axis of symmetry of the annulus of which the ring segment 465 is a part, are generally aligned, which may include being coincident. By "longitudinally spaced", it is meant that the ring segments 465 are spaced along a longitudinal axis, which may include that coincident circular axis of rotation. The longitudinal spacing of the ring segments 465 may be uniform, or irregular. The cradle 470 may further include one or more longitudinal frame members 471, and the ring segments 465 may be rigidly mounted on the frame members 471 to space the ring segments 465 longitudinally and align them concentrically.

Figure 13:
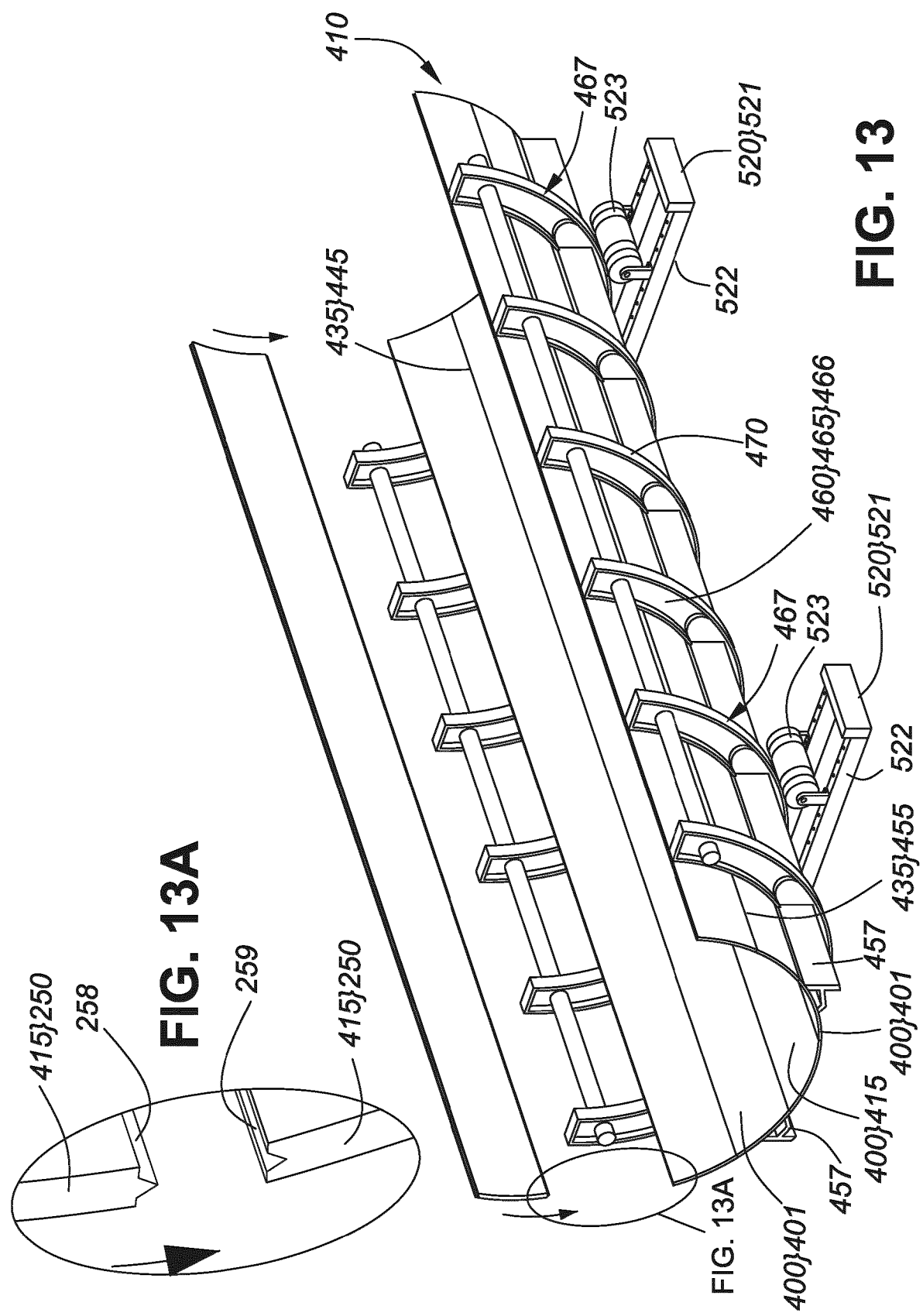
FIG. 13 shows a perspective view of the cradle of FIG. 12 and a partly-assembled first semi-cylindrical shell.

As best seen in FIG. 13, the first semi-cylindrical shell 410 may be formed from panels 415 by laying the panels 415, which may be one-by-one in sequence, in the cradle 470 to form the first semi-cylindrical shell 410. The cradle 470 supports the panels 415 thus assembled to maintain the semi-cylindrical shape of the first semi-cylindrical shell 410. As noted above, the panels 400 may be the longitudinal curved panels 250, and thus, as shown in FIG. 13A, laying the panels 415 in the cradle 470 to form the first semi-cylindrical shell 410 may include joining the panels 250 at abutting edges by mating the tongue 258 of one panel 250 with the groove 259 of an abutting panel 250 to form a joint 260 being joint 435, and joining the multiple panels 415 in sequence to form the first semi-cylindrical shell 410.

Figure 11A:
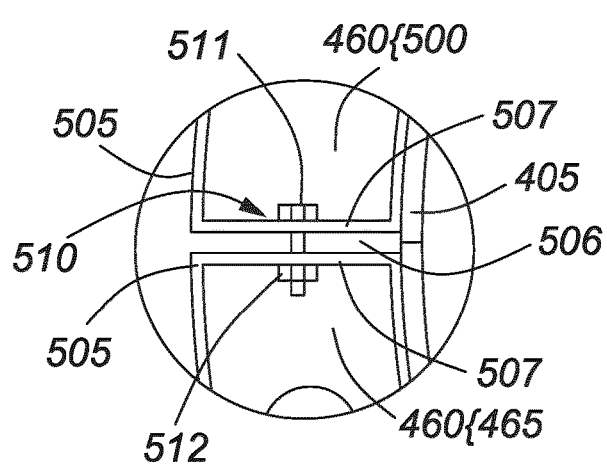
FIG. 11A shows a detail view of constricting means of the collars.
Figure 11B:
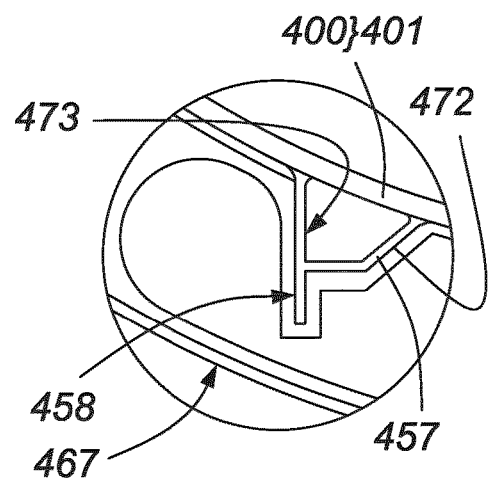
FIG. 11B shows a detail view of a recess of a ring segments of the collar receiving a longitudinal rail of the cylindrical shell.

As noted above, one or more of the panels 400 may be panels 401 formed with a profile or projection, which may be a longitudinal rail 457. In such case, one or more of the ring segments 465 may be ring segments 466 formed with one or more recesses 472 sized, shaped, and positioned so as fittingly to receive the longitudinal rail 457 when the panel 401 is laid in the cradle 470, as best seen in FIGS. 11, 11B and 13. The recesses 472 may be sized and shaped such that an inside surface 473 of the recess 472 fittingly contacts an outside surface 458 of the longitudinal rail 457, or they may be sized and shaped to provide a gap between the inside surface 473 of the recess 472 and the outside surface 458 of the longitudinal rail 457. In this way, although the first semi-cylindrical shell 410 including panels 401 having longitudinal rails 457 would not have an external surface that is an unbroken semi-cylinder, the ring segments 466 with recesses 472 provide outer radial surfaces 467 that are smooth, unbroken semi-annuli. The usefulness of this feature will become apparent below.

Having formed the first semi-cylindrical shell 410 in the cradle 470, at least one spacer 480 may be placed in the first semi-cylindrical shell 410, which may be upright in the first semi-cylindrical shell 410. As will be seen below, the spacer is sized, shaped, and configured to space at least some of the panels 400 to maintain a cylindrical shape of the cylindrical shell 405, once assembled.

Figure 14:
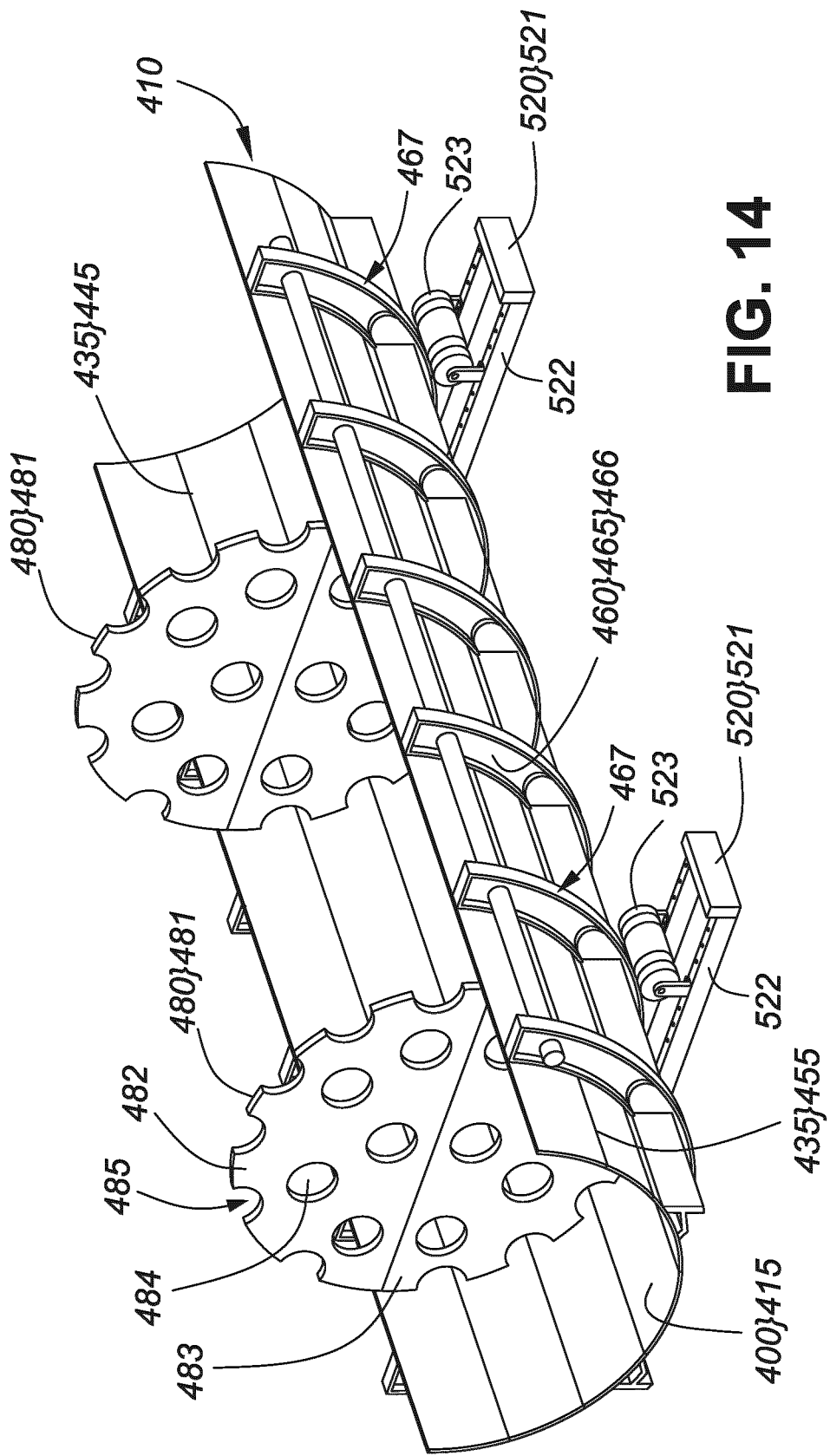
FIG. 14 shows a perspective view of the cradle and first semi-cylindrical shell of FIG. 13 and circular spacing disks resting upright in the first semi-cylindrical shell.

For example, as shown in FIG. 14, the at least on spacer 480 may include at least one circular spacing disk 481, which may be placed upright and concentrically in the first semi-cylindrical shell 410 so as to contact respective inside surfaces of at least some of the panels 415 of the first semi-cylindrical shell 410. In this way, the first semi-cylindrical shell 410 may support the at least one circular spacing disk 481. The at least one spacing disk 481 may include a plurality of rigidly assembled parts, which may include a first semi-disk 482 and a second semi-disk 483 configured for rigid assembly to form the circular spacing disk 481. For this purpose, the first semi-disk 482 and second semi-disk 483 may include any suitable fastening means (not shown) configured reversibly, but rigidly, to assemble the first semi-disk 482 and second semi-disk 483 to form the circular spacing disk 481. For example, the first semi-disk 482 and second semi-disk 483 may each have one or more cooperating through holes (not shown) sized and space to receive cooperating bolts, such that when the through holes are aligned, bolts are passed therethrough, and affixed using cooperating nuts, the first semi-disk 482 and second semi-disk 483 are rigidly, but reversibly, assembled into the circular spacing disk 481. The circular spacing disk 481 including the first semi-disk 482 and second semi-disk 483 may be provided with one or more openings 484, which may be circular, and/or one or more scallops 485, which may be semi-circular, along a circumference thereof. The spacing disk 481, including the first semi-disk 482 and second semi-disk 483 may be formed of any suitable material, and in some embodiments is formed of a metal which may include steel or aluminum.

Figure 15:
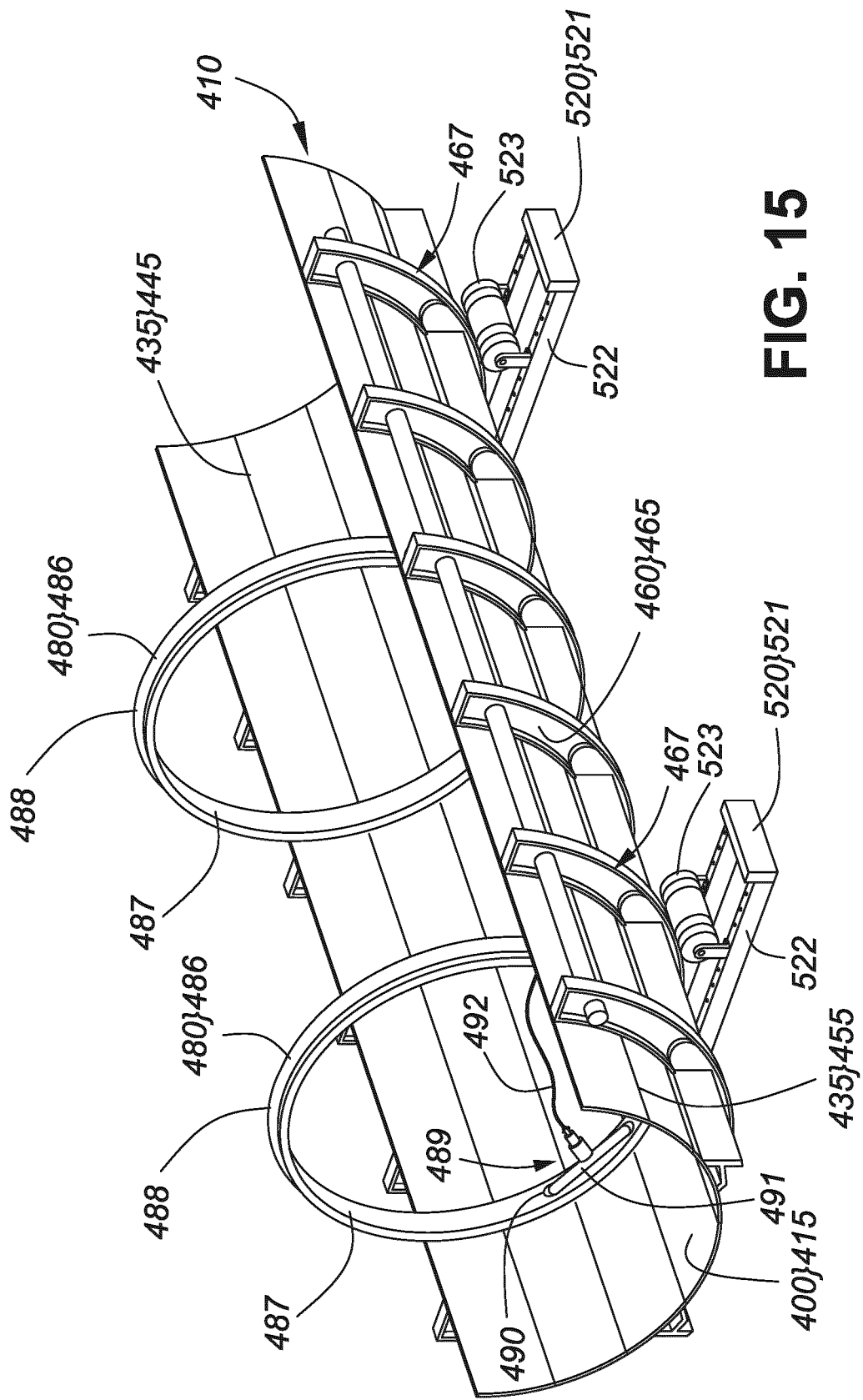
FIG. 15 shows a perspective view of the cradle and first semi-cylindrical shell of FIG. 13 and circular spacing rings resting upright in the first semi-cylindrical shell.

Alternatively, as shown in FIG. 15, the spacer 480 may include at least one circular spacing ring 486 comprising an annular rim 487 formed with an outer U-shaped channel sized and shaped fittingly to receive an inflatable annular tube 488. The annular rim 487 may be formed of any suitable material, and in some embodiments is formed of a metal, which may include aluminum or steel. The inflatable annular tube 488 may be formed of any suitable material, and in some embodiments is formed of rubber or plastic. The inflatable annular tube 488 may comprise any connection means 489 suitable to connect the inflatable annular tube 488 to a pressure source (not shown), such as a hydraulic or pneumatic pump, operable to pressurize the inflatable annular tube 488 and thereby to expand an outer circumference of the inflatable annular tube 488. The rim 487 may include one or more through holes 490 to allow passage of a portion 491 of the tube 488 to facilitate connection of the connection means 489 to a hose 492 or other connection to the pressure source. As shown in FIG. 15, in some embodiments the portion 491 of the tube 488 traverses through holes 490, and is a segment of the tube 488. In other embodiments, the portion 491 is a radial segment cement or welded onto the tube 488, and may be similar to an inflation stem of a bicycle tube. In some embodiments, the spacer 480 is configured and arranged substantially similarly to a bicycle rim omitting the hub and spokes, and bicycle tube.

Figure 16:
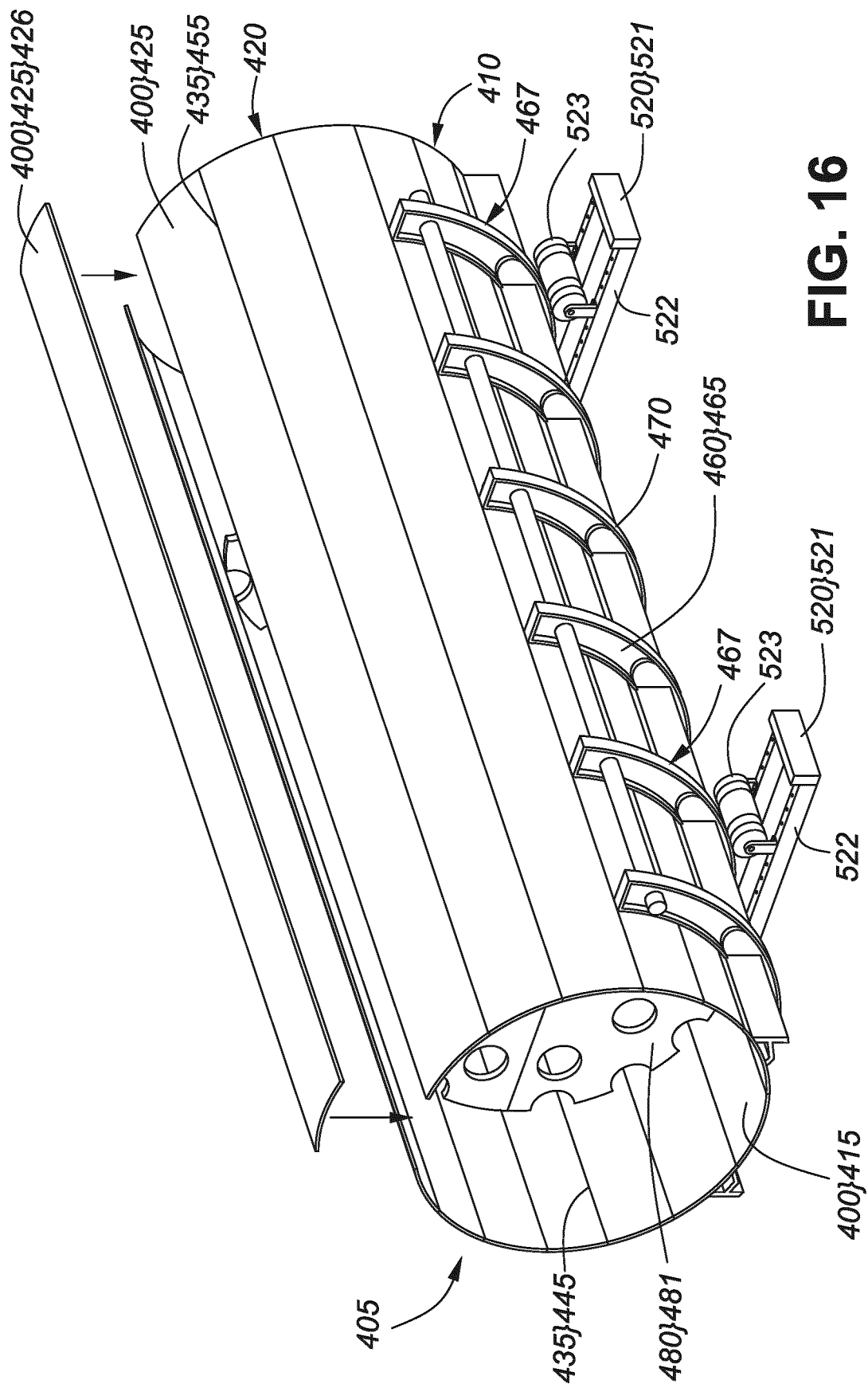
FIG. 16 shows a perspective view of the cradle, first semi-cylindrical shell, and circular spacing disks of FIG. 14, and a partly-assembled second semi-cylindrical shell.

As shown in FIG. 16, having placed the at least one spacer 480 in the first semi-cylindrical shell 410, the second semi-cylindrical shell 420 may be formed from panels 425, and this may be done in substantially the same way as the first semi-cylindrical shell 410 may be formed from panels 415 as described above, except instead of laying the panels 425 in the cradle 470, the panels 425 may be laid atop the first semi-cylindrical shell 410 and the at least one spacer 480 to form the second semi-cylindrical shell 420. The at least one spacer 480 may contact respective inside surfaces of at least some of the panels 425 of the second semi-cylindrical shell 420, and thereby support the second semi-cylindrical shell 420 while maintaining a semi-cylindrical shape of the second semi-cylindrical shell 420. As with the first semi-cylindrical shell 410, the panels 400 may be the longitudinal curved panels 250, and thus laying the panels 425 as described above to form the second-semi-cylindrical shell may include joining the panels 250 at abutting edges by mating the tongue 258 of one panel 250 with the groove 259 of an abutting panel 250 to form a joint 260 being joint 435, and joining the multiple panels 415 in sequence. A last panel 426 so laid may form respective joints 435 at abutting panels 400 at either edge, to form the second semi-cylindrical shell 420.

In this way, the cylindrical shell 405 may be formed from the first semi-cylindrical shell 410 and the second semi-cylindrical shell 420. The at least one spacer 480 may space the panels 400 to maintain a cylindrical shape of the cylindrical shell 405.

Importantly, the cylindrical shell 405 may be thus assembled without requiring any tack welding. It is common in the art of welding to position items to be welded together and then form tack, or spot, welds as a temporary means to hold the components in the desired positions until final welding can be performed. In some embodiments, the panels 400 are free, or substantially free, of tack welds prior to creation of final welds joining adjacent panels. The above-described method including use of the cradle 470 and the at least one spacer 480 enables assembly of the cylindrical shell 405 without need for tack welds to maintain the desired positions of the panels 400. Further advantages of the absence of tack welds are discussed below.

Alternatively, in some embodiments tack welds may be used to dispense with the at least one spacer 480. For example, following assembly of the first semi-cylindrical shell 410 as described above, the panels 415 may be partly fastened, which may be by partial welding, which may be by tack welding, at seams of the joints 435 of the panels 415, thereby to give the first semi-cylindrical shell 410 a preconfigured partial rigidity. Then, the first semi-cylindrical shell 410 may be removed from the cradle 470, which may be by craning or any other suitable conveyancing means, and the second semi-cylindrical shell 420 may be formed in the cradle 470 in the manner described above and shown in FIG. 13 with respect to the first semi-cylindrical shell 410. Then, the partly-affixed first semi-cylindrical shell 410 may be turned-over, or flipped, and placed atop the second semi-cylindrical shell 420 to form the cylindrical shell 405. Alternative methods are also possible, and the principles disclosed herein are applicable to any method where the cylindrical shell 405 is formed from panels 400 while maintaining the cylindrical shape of the cylindrical shell 405.

Figure 17:
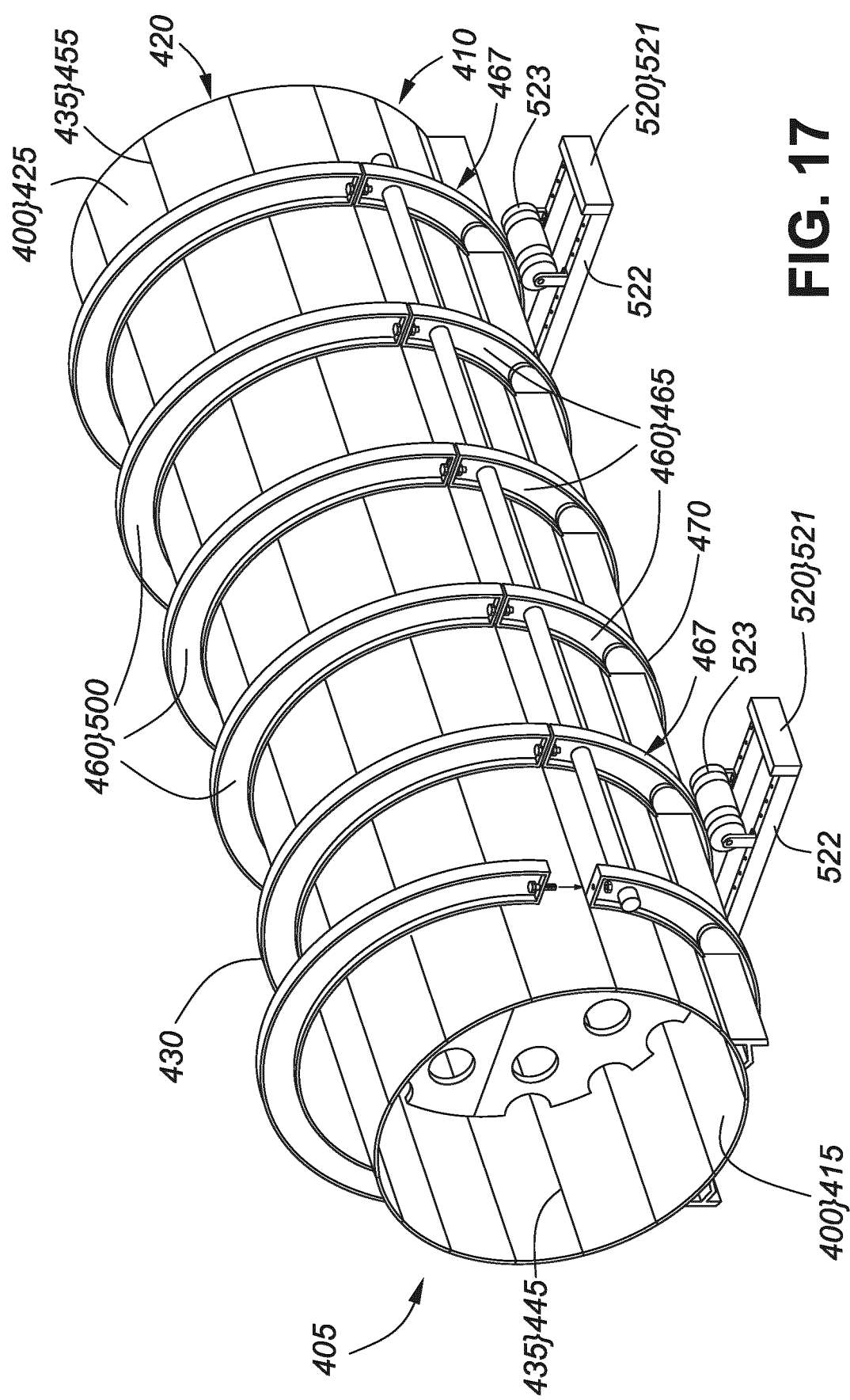
FIG. 17 shows a perspective view of the cradle, cylindrical shell, circular spacing disks, and assembly of collars encircling the cylindrical shell.

Having formed the cylindrical shell 405, a second set of the ring segments 460 may be ring segments 500 respectively paired with ring segments 465 which form the cradle 470, as shown particularly in FIG. 17. Each of the ring segments 465, 500 which forms a pair of the ring segments 460 which together form an annular collar 430 may include a half of the annulus describing the annular collar 430, or in other words which subtends about 180° of the annulus. Other variations and combinations are possible. As shown especially in FIGS. 11, 11A and 17, the ring segments 500 may be laid atop the cylindrical shell 405 and the ring segments 465 in pairwise fashion so as to oppose respective adjacent ends 505 of each pair of ring segments 460 to form the one or more annular collars 430 conformably encircling the cylindrical shell 405. The pair of ring segments 460 may be sized and shaped relative to the cylindrical shell 405 so as to provide a small gap 506 at the opposing respective adjacent ends 505 when the collar 430 is formed. Without limitation, in some embodiments the gap is between 0.5" and 4" (1.27 cm and 10.16 cm), or is between 1" and 3" (2.54 cm and 7.62 cm), or is about 2" (5.08 cm). The collar 430 may be provided with constricting means 510 where the respective adjacent ends 505 of the pair of ring segments 460 oppose. For example, the ring segments 460 may include through holes in flanges 507 at the respective adjacent ends 505 of the pair of ring segments 460 where they oppose, and a bolt 511 and nut 512 combination. By inserting the bolt 511 into the through holes, threading the nut 512 onto the bolt 511, and tightening the nut 512 in the known manner, the ends 505 may be drawn together, reducing the gap 506, causing an inner surface of the collar 430 to apply a substantially uniform centripetal force about the circumference of the cylindrical shell 405. In this way, at least some of the pairs of panels 400 may be compressed at their respective joints 435. One or more of the collars 430 may be provided with substantially similar constricting means 510 at each of the respective adjacent ends 505 where the pair of ring segments 460 oppose, as shown in FIG. 11. Alternatively, the pair of ring segments 460 may be provided with a fixed attachment, for example a hinge, at one side, and constricting means 510 at the other side. In some embodiments, the constricting means 510 may include one or more of a ratchet, a cam lever, or a motor. Other configurations are possible to provide the function of constricting the cylindrical shell 405 in order to compress at least some of the pairs of panels 400 at their respective joints 435.

Figure 18:
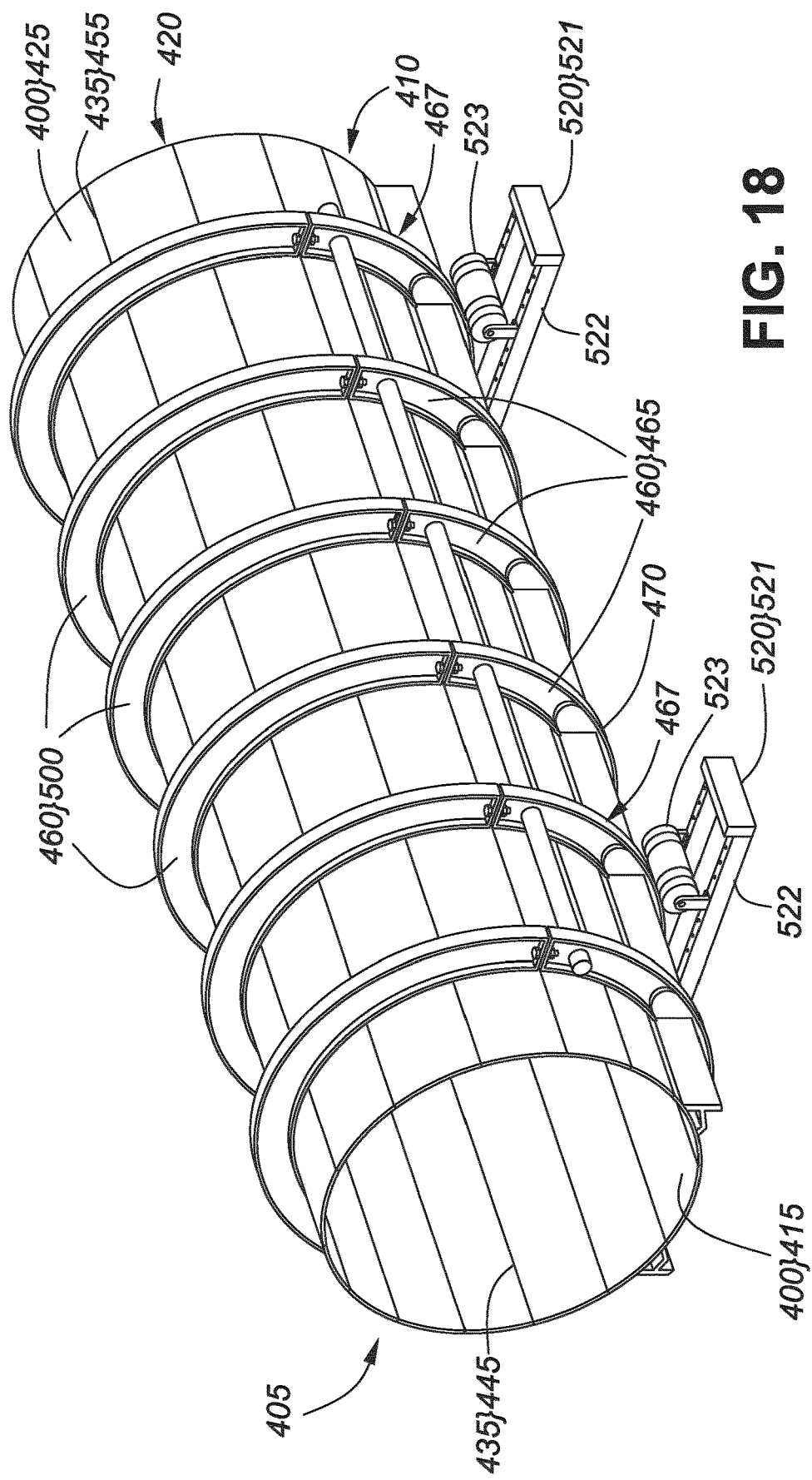
FIG. 18 shows a perspective view of the collars and cylindrical shell of FIG. 17 with the circular spacing disks removed.

Having clamped and constricted the cylindrical shell 405 in this way, it may become unnecessary to retain the spacers 480 in order to maintain the cylindrical shape of the cylindrical shell 405. The pressure developed at the joints 435 may be sufficient to maintain the cylindrical shape of the cylindrical shell 405. Accordingly, as shown in FIG. 18, the spacers 480 (not shown in FIG. 18, but shown in FIGS. 14 through 17) may be removed leaving the cylindrical shell 405 with an unobstructed hollow. For example, where the spacers 480 include at least one circular spacing disk 481, removal may include disassembling it into the first semi-disk 482 and second semi-disk 483, for example by loosening of the nuts and removal of the bolts in the aligned through holes which hold the first semi-disk 482 and second semi-disk 483 together, followed by removal of the first semi-disk 482 and second semi-disk 483 from the interior of the cylindrical shell 405. Where the spacers 480 include at least one circular spacing ring 486, removal may include at least particular release of pressure from the inflatable annular tube 488 so as at least partially to deflate it thereby to reduce pressure between the inflatable annular tube 488 and the inside surface of the cylindrical shell 405, followed by removal of the circular spacing ring 486 from the interior of the cylindrical shell 405.

As discussed above, the cylindrical shell 405 may be formed free, or substantially free, of tack welds or other adjoining alterations or fasteners prior to the formation of final welds to join the panels 400. In such case, the additional advantage may be achieved that the centripetal constriction of the cylindrical shell 405 using the collars 430 and constricting means 510 to compress at least some of the pairs of panels 400 at their respective joints 435 may do so more effectively or more optimally, as compared to when tack welds are used, inasmuch as the panels 400, when free or substantially free of tack welds, are more free to move at the joints 435, and thus a more compressed joint 435 may be achieved, thereby enabling a superior final weld.

Figure 19:
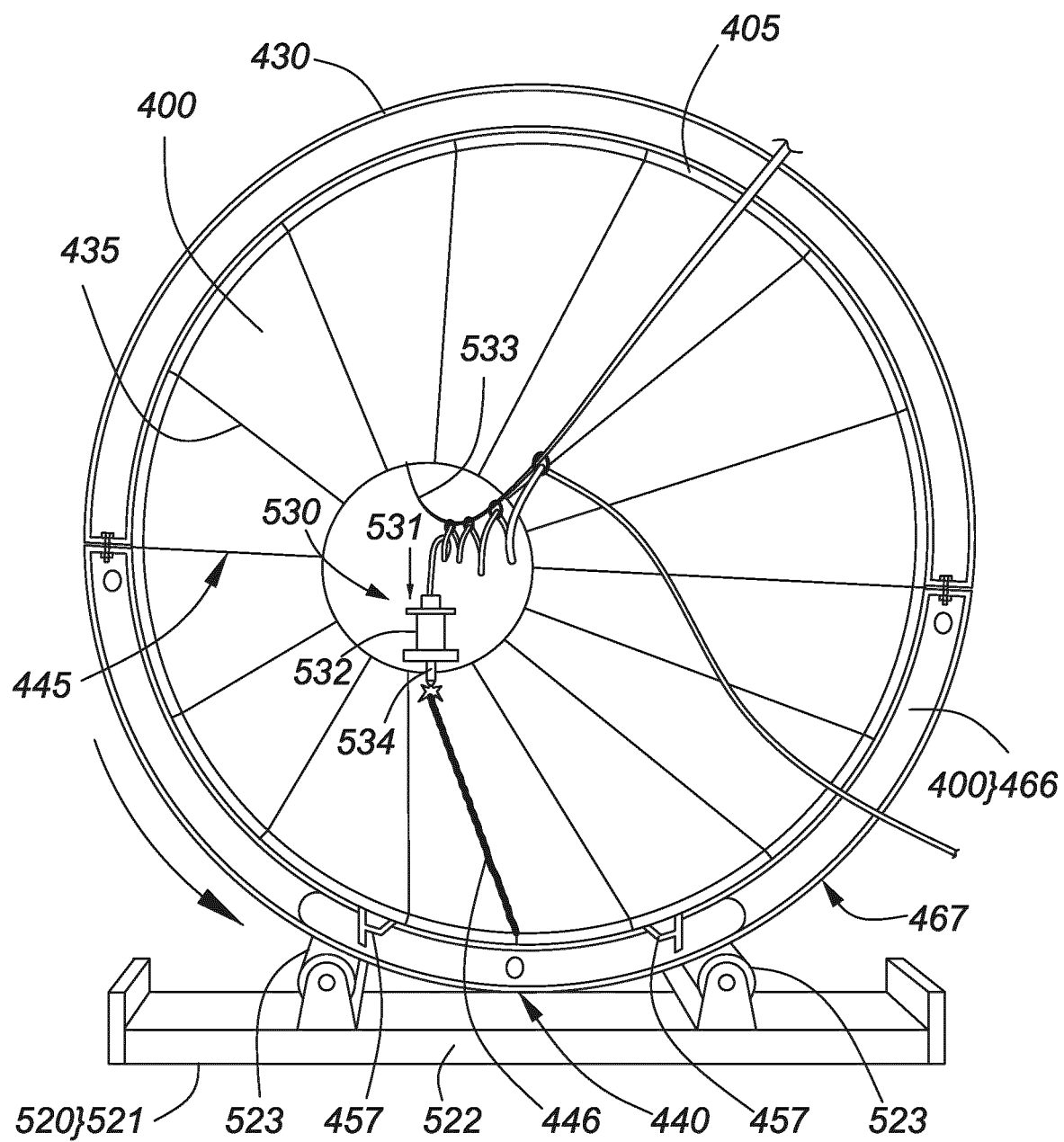
FIG. 19 shows an end view of the assembly of collars and cylindrical shell illustrating welding of inner joint seams and rolling on tank rollers to bring the seams to a lower position, where the welding assembly has a single welding torch.

As shown in FIG. 19, with the interior hollow of the cylindrical shell 405 unobstructed, the inside seams 445 of the joints 435 of respective pairs of panels 400 may be welded in a single welding operation to produce a welded inside seam 446.

As is known in the art, superior welds are usually formed when the heat source is applied directly vertically above the seam to be welded, such that the weld pool formed by fusion of the materials at the joint rests in the seam and is not drawn, or is minimally drawn, by gravity away from the joint. When the heat source is not directly vertically above the seam, but is displaced angularly from this position, and especially if it is directly vertically below the seam, then there may occur at least some flow of the weld pool away from an optimal position in the joint, and the quality of the weld may be reduced. Thus, it is preferable to weld 'downwardly', that is with the heat source directly vertically above the seam to be welded.

Thus, in order to produce a superior welded seam 446, the assembly of the cylindrical shell 405 and collars 430 may be rolled, or rotated about the longitudinal axis L* of the cylindrical shell 405 (shown in FIG. 8) to bring the joint 435 to a lower position 440, and the inside seam 445 may be welded to produce the welded inside seam 446 when at the lower position 440. The lower position 440 may be substantially the lowermost point on the inner circumference of the cylindrical shell 405, or in other words the lower position 440 may be plumb the longitudinal axis L*. Alternatively, the lower position 440 may be angularly displaced from the lowermost point by a predetermined or limited amount. Without limitation, the joint 435 may be angularly displaced from the lowermost point by less than about 90°, or less than about 70°, or less than about 45°, or less than about 10°. Positioning of the inside seam 445 at the lower position 440 in this way which enables the production of a welded inside seam 446 of superior strength and quality as compared to a welded seam when the seam must be welded not downwardly, but instead upwardly or at an intermediate angle.

In order to roll the assembly of the cylindrical shell 405 and the collars 430, the assembly may be placed on a rolling apparatus 520 configured to enable the above-described rolling of the assembly of the cylindrical shell 405 and the collars 430. For example, the rolling apparatus 520 may include one or more, which may be at least a pair, of tank rollers 521 including a base 522 and at least a pair of cylindrical rollers 523 mounted on the base 522. As shown in FIGS. 11 to 20, the rollers 523 of the rolling apparatus 520 may contact and support outer annular surfaces 467 of corresponding collars 430. The tank rollers 521 may include one or more motors (not shown) to drive one or more of the rollers 523. As described above, the collars 430 may be substantially circular in shape, and thus the assembly of the cylindrical shell 405 and the collars 430 may be smoothly and easily rolled through 360° about the longitudinal axis L* using the tank rollers 521. Moreover, by supporting the collars 430 with the rollers 523 of the tank rollers 521 as opposed to the outer surface of the cylindrical shell 405, if the cylindrical shell 405 includes one or more panels 401 formed with a profile or projection, which may be longitudinal rails 457, and the collars 430 include ring segments 466 formed with corresponding recesses 472 (best shown in FIGS. 11 and 12), then the projections impose no obstacle to the smooth and uninterrupted rolling of the assembly of the cylindrical shell 405 and the collars 430 through one or more full rotations about the longitudinal axis L*.

The assembly of the cylindrical shell 405 and the collars 430 may be placed on the rolling apparatus 520 after assembly, by using a crane or other conveyancing means, for example, or as shown in FIGS. 12-18, the cradle 470 may initially be formed and positioned on the rolling apparatus 520 and the assembly of the cylindrical shell 405 and the collars 430 may be assembled while the cradle 470 is supported by the rolling apparatus 520.

Figure 20:
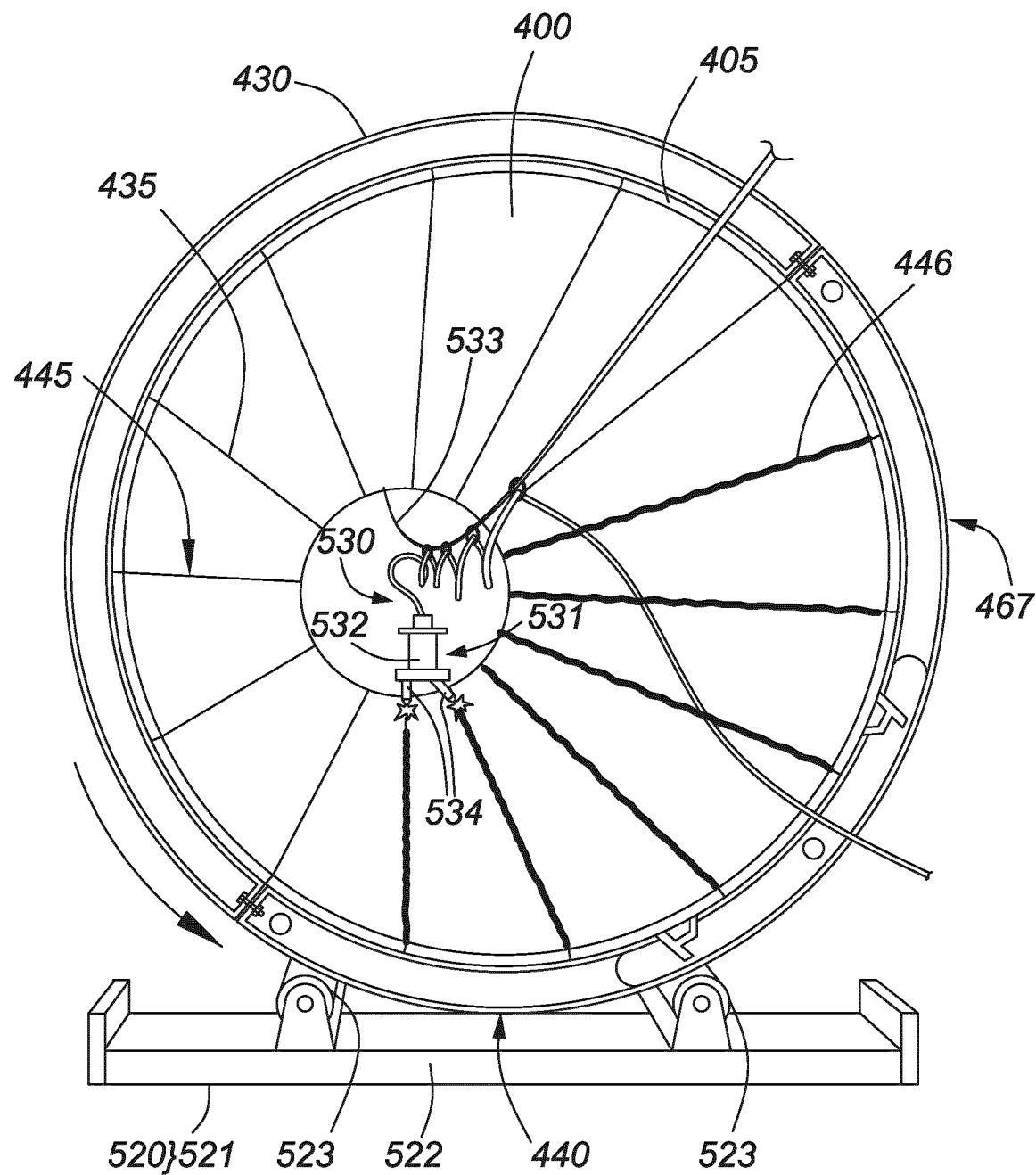
FIG. 20 shows an end view of the assembly of collars and cylindrical shell illustrating welding of inner joint seams and rolling on tank rollers to bring the seams to a lower position, where the welding assembly has two welding torches.

The inside seam 445 of each joint 435 may be welded by any suitable means. For example, each inside seam 445 may be welded manually by a human welder using a welding apparatus 530, and this may be facilitated by the absence of any obstacle within the hollow of the cylindrical shell 405. The welding apparatus 530 may include a handheld torch, or alternatively, as shown in FIG. 19, may include a welding carriage 531 including a welding head 532 slidingly suspended from a suspension line 533 supported at opposite ends by suspension line supports (not shown). The welding head 532 may be movable along the seam 445 by a human operator, or the welding carriage 531 may be movable automatically, and thus may include robotic means, which may include robotic motion systems and/or robotic vision systems. As shown in FIG. 19, the welding head 532 may include a single welding torch 534, or as shown in FIG. 20 it may have more than one welding torch 534, which may be two welding torches 534. In the latter case, the welding apparatus 530 may be operable to weld two inside seams 445 at a time, per motion of the of the welding head 532 from one end of the cylindrical shell 405 to the other end, and for each pair of seams 445 the cylindrical shell 405 may be rolled either to position one of the two seams 445 at the lowermost position 440, or instead to position a midpoint between the two seams 445 at the lowermost position 440 so as to minimize a displacement of each seam from the lowermost position 440.

The form and nature of the welding apparatus 530, including the welding head 532 and welding torch 534, may depend on the material of the panels 400, and in general will be selected according to the material of the panels 400. For example, when the panels 400 are formed of aluminum, the welding apparatus 530 may include any suitable welding technology, appropriate for the material to be welded, and in some embodiments includes steel or aluminum welding technologies, which may include constant voltage, constant current, pulsed welding, or laser welding technology.

Figure 21:
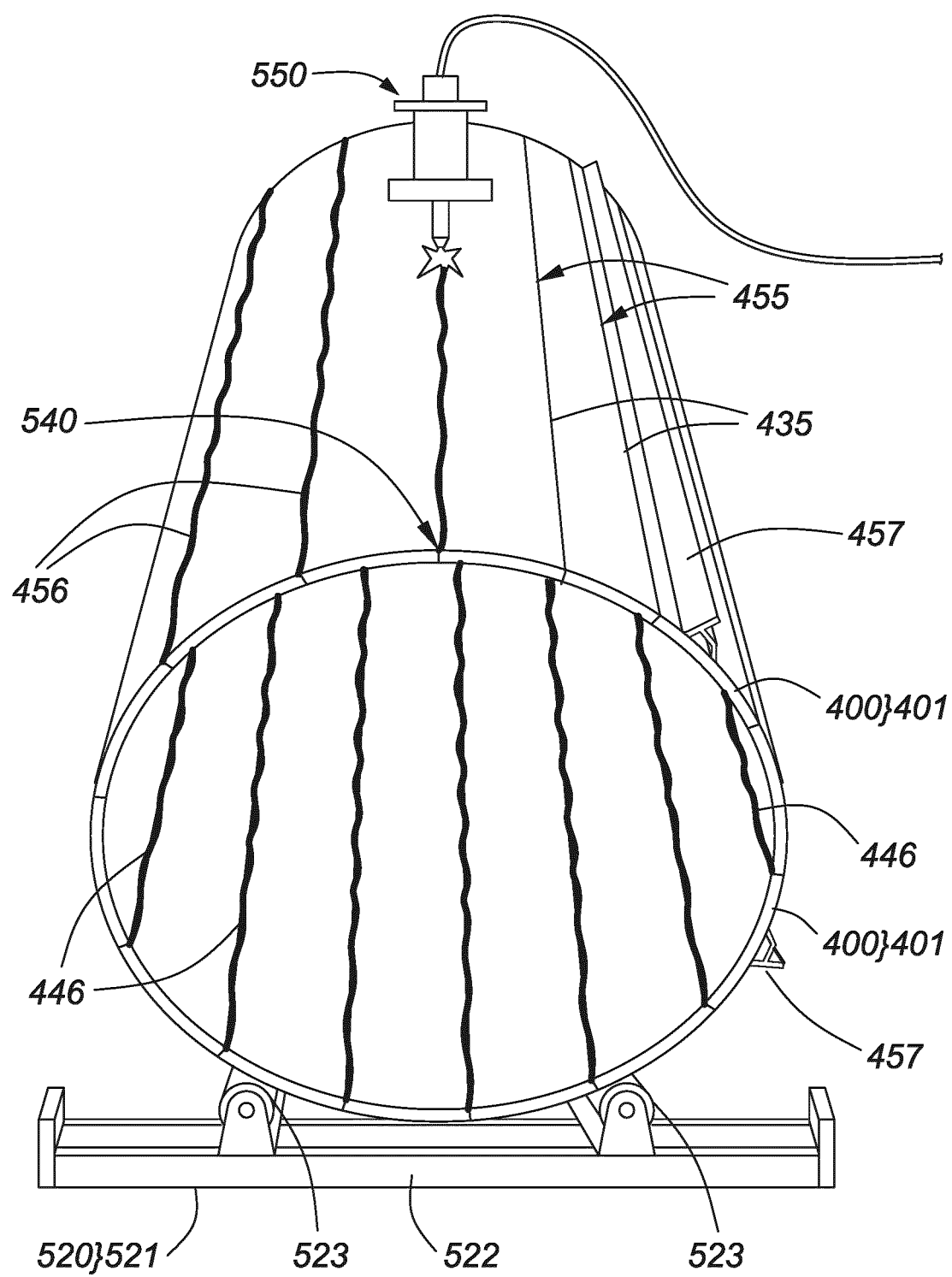
FIG. 21 shows an end view of the cylindrical shell having welded inner joint seams, with the collars removed, and illustrating welding of outer joint seams and rolling on tank rollers to bring the outer joint seams to an upper position, where the welding assembly has a single welding torch.
Figure 22:
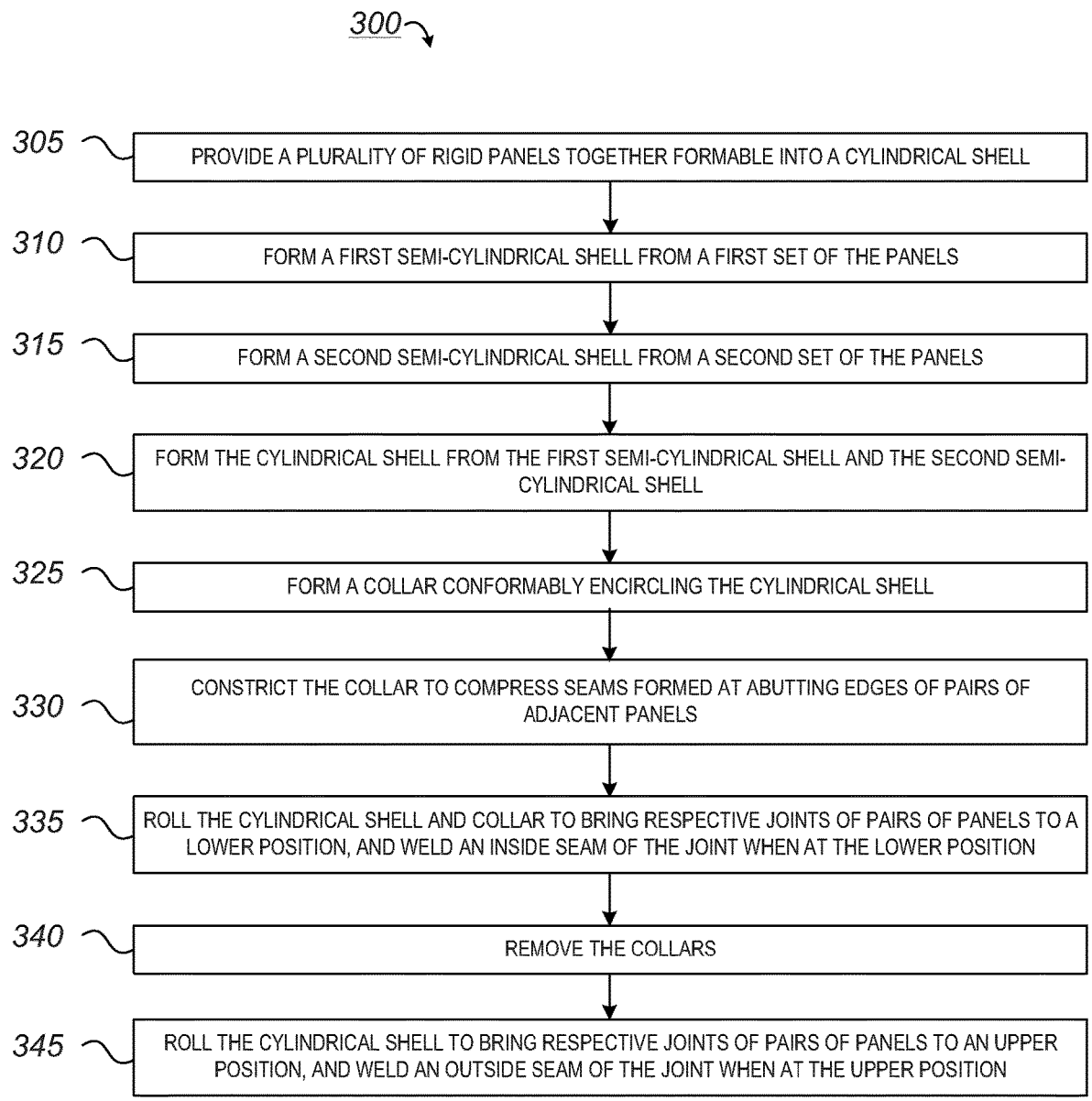
FIG. 22 is a flowchart of a method of manufacturing a cylindrical cargo container.

As shown in FIG. 21, once all of the inner seams 445 of the joints 435 are welded to form welded inner seams 446, the outer seams 455 of the joints 435 may be welded to form welded outer seams 456. The collars 430 may be removed in order to expose the entire outer surface of the cylindrical shell 405, including the entire length of each outer seam 455 without obstacle. For example, the assembly of the cylindrical shell 405 and collars 430 may be lifted using a crane or other conveyancing means, the collars 430 may be removed by unfastening the constricting means 510 and separating and removing the ring segments 460, and the cylindrical shell 405 may be replaced on the rolling apparatus 520. The welded inner seams 446 may provide sufficient structural strength to the cylindrical shell 405 that substantially no movement, or minimal movement, or movement within preconfigured tolerances, occurs of the panels 400 relative to one another during movement of the cylindrical shell 405.

When the rolling apparatus 520 includes the tank rollers 521, as shown in FIG. 21, the cylindrical shell 405 may be rolled, or rotated, about its longitudinal axis L* to bring each outer seam 455 in turn to an upper position 540, which may be substantially the uppermost point on the outer circumference of the cylindrical shell 405, or in other words directly vertically above the longitudinal axis L*. Each outer seam 455 may be welded to form a welded outer seam 456 in substantially the same way as the inner seams 445 are welded to form the welded inner seams 446. Thus, as shown in FIG. 21, a welding apparatus 550 may be provided and suspended above the cylindrical shell 405 which is substantially similar to the welding apparatus 530 used to weld the inner seams 445, and described above. As was the case with the inner seams 445, positioning of the outer seam 455 at the upper position 540 and disposition of the welding apparatus 550 directly above the outer seam 455, thereby enabling vertically downward welding of the outer seam 455, may enable the production of a welded outer seam 456 of superior strength and quality as compared to a welded seam when the seam must be welded not downwardly, but instead upwardly or at an intermediate angle.

As shown in FIG. 21, if the cylindrical shell 405 includes panels 401 having longitudinal rails 457, then the cylindrical shell 405 may not be rotatable though a full 360° about its longitudinal axis L*, as at a certain point in its rotation the longitudinal rails 457 may collide with the rollers 523 of the tank rollers 521. In such case, a crane or other conveyancing means may be used to lift and roll the cylindrical shell 405 past these obstructions, after which the cylindrical shell 405 may be replaced on the tank rollers 521.

Figure 23:
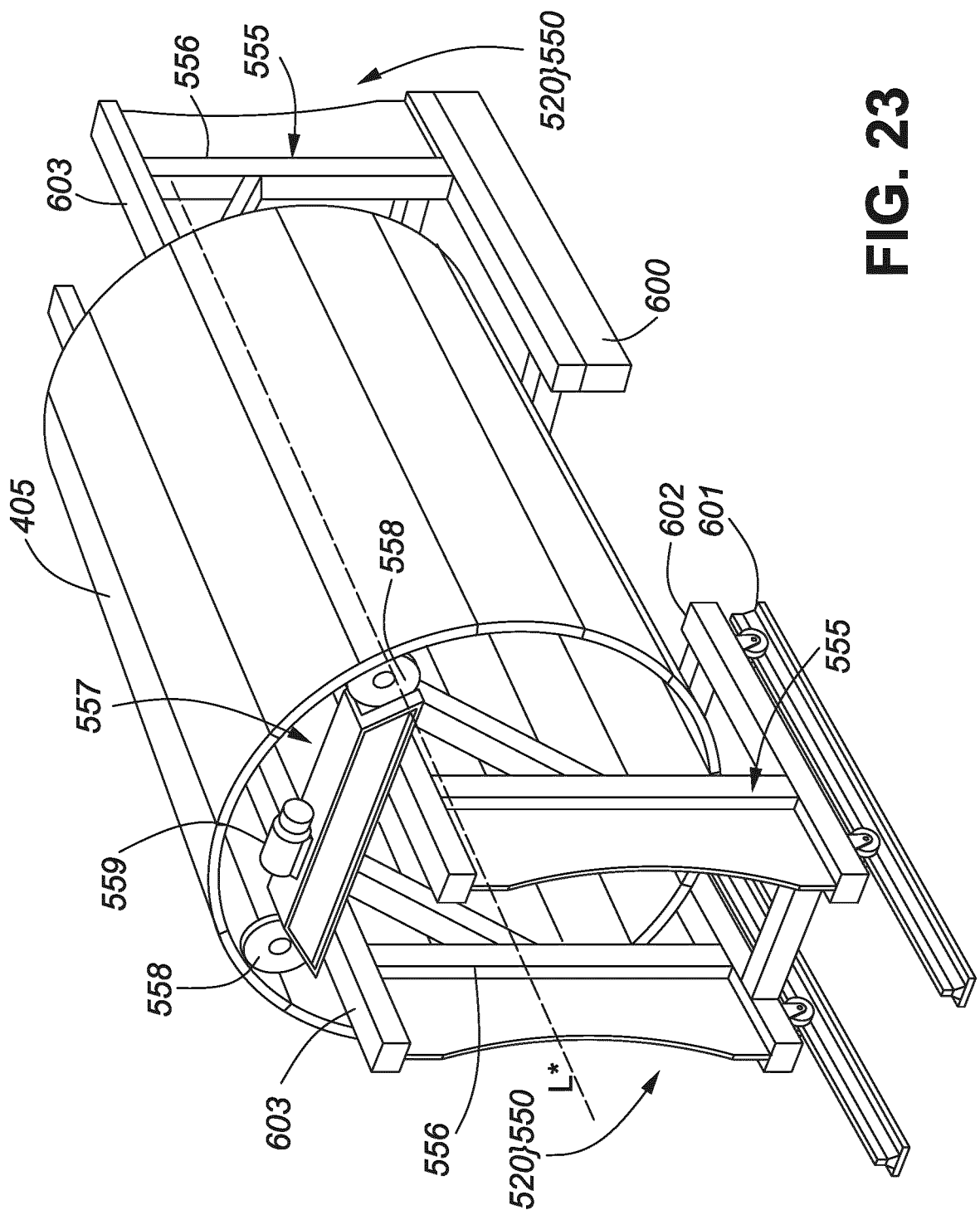
FIG. 23 is a perspective view of a raised roller apparatus suspending a cylindrical shell for welding of inner and/or outer joint seams, and rolling of the cylindrical shell to position the inner seams at lower positions and outer seams at upper positions.

Alternatively, and as shown in FIG. 23 the rolling apparatus 520 may include additionally or alternatively a raised roller apparatus 550 comprising at least a pair of raised roller carriages 555 each comprising a frame 556 supporting a roller assembly 557 mounted on the frame 556, the roller assembly 557 having at least one, which may be two, rollers 558 which may include rotatably mounted wheels. One or more of the roller assemblies 557 may include or interface with a motor 559 mounted and connected to drive one or more of the rollers 558. The raised roller carriage 555 may be placed to position the rollers 558 to contact and support the cylindrical shell 405 at an inner surface of a top half of the cylindrical shell 405, such that the rollers 558 are turnable with a rotation of the cylindrical shell 405 about its longitudinal axis L*. The motor 559 may drive one or more of the rollers 558 of either or both of the raised roller carriages 555 thereby to rotate the cylindrical shell 405 about its longitudinal axis L*. All of the rollers 558 may be driven in this way, or some may be undriven and turn freely with the rotation of the cylindrical shell 405. One or both of the raised roller carriages 555 may rest stationary on the ground and the frame 556 may have a footing 600 for such purpose. One or both of the raised roller lift carriages 555 may be configured to roll along a track 601, and thus the frame 556 may have a corresponding wheeled suspension 602 configured and positioned for mounting the raised roller carriage 555 on the track 601. The track 601 may be so positioned to enable rolling of the raised roller carriage 555 along the longitudinal axis L* of the cylindrical shell 405 so as to enable an upper portion 603 of the frame 556 and thus the roller assembly 557 into the cylindrical shell 405 for placement of the cylindrical shell 405 onto the roller assembly 557 to support the cylindrical shell 405 on the rollers 558.

The cylindrical shell 405 may be positioned and placed to be rollably supported by the raised roller carriages 555 in any suitable way. For example, one or both of the raised roller carriages 555 may be moved to a retreated position, the cylindrical shell 405 may be moved into a preconfigured place between the roller lift carriages 555, which may be by lifting using a crane or other conveyancing means, the one or both of the raised roller carriages 555 may be moved to an advanced position to as to bring the upper portion 603 and roller assemblies 557 into the corresponding opposite ends of the cylindrical shell 405, and the cylindrical shell 405 may be then be lowered onto the roller assemblies 557, and thus be rollably supported by the roller assemblies 557 and raised roller carriages 555 as described. Alternative methods and configurations are possible.

The raised roller apparatus 550 may be used additionally or alternatively to the tank rollers 521 in order to roll the cylindrical shell 405 in order to weld the inner seams 445 and/or outer seams 455 of the joints 435, as described above. Use of the raised roller apparatus 550 shown in FIG. 22 produces a number of advantages. Unlike the tank rollers 521, the inclusion in the cylindrical shell 405 of longitudinal rails 457 presents no obstacle to rotation of the cylindrical shell 405 a full 360° about its longitudinal axis L* using the raised roller apparatus 550, as the inside surface of the cylindrical shell 405 may possess no corresponding obstacles which might collide with the rollers 558 of the raised roller assemblies 557. Moreover, the assembly of the cylindrical shell 405 and the collars 430 and the spacers 480 may be positioned and placed on the raised roller carriages 555, as described above, and once the spacers 480 are removed, performance of welding operations both inside and outside of the cylindrical shell 405 may be performed without need of a further step to lift the cylindrical shell 405 and collars 430 in order to remove the collars 430 to permit welding of the outside seams 455.

Providing both welded inner seams 446 and welded outer seams 456 may provide for a stronger and more water-tight weld, as compared to providing only welded inner seams 446 or only welded outer seams 456. In some embodiments, however, it may be sufficient to provide only welded inner seams 446 or only welded outer seams 456, and yet provide a welded cylindrical shell with sufficient strength, integrity, and/or water-tightness, for the particular application of the embodiment. In such case, manufacture of the cylindrical shell 405 may be simplified.

The techniques described above may provide numerous advantages. For example, by enabling the welding of seams in an optimal, downward position, the cylindrical shell may be provided with improved, or optimal, or maximal structural strength and integrity. Moreover, formation of the cylindrical shell followed by centripetal constriction using the collars and constricting means, thereby developing pressure at the panel joints, may also improve the structural strength and integrity of the welded seams. This may be true especially as compared to welded seams formed if the panels are assembled only loosely, and not under such pressure. The improvement in structural strength and integrity of the welded seams, and thus the cylindrical shell, may be sufficient to reduce or eliminate the requirement for other structural elements, for example ribs or internal and/or external flanges, in some embodiments. Moreover, the improved integrity of the welded seams may enable the production of a water-tight, or substantially water-tight, container.

Moreover, the use of the collars and rolling apparatus may reduce or minimize manufacturing time by reducing or minimizing the time required to bring each seam to an optimal vertically downward position for welding. Moreover, the use of the spacers may enable the formation of the cylindrical shell under pressure thereby enabling many of the advantages described above. Finally, the techniques described herein may reduce, and may reduce substantially, the time and effort required to construct cylindrical trailers from longitudinal panels.

The cylindrical shell manufactured as described herein may form and be used to construct a cylindrical cargo container, including a cylindrical cargo container for a tanker truck, or a trailer, or a railcar, which in turn may be used to construct a tanker truck, a trailer, or a railcar respectively, by assembly with any desired additional components, as discussed hereinabove and as known in the art.

The following are examples according to the disclosure herein.

Example 1. A method of manufacturing a cylindrical cargo container, the method comprising: providing a plurality of rigid panels together formable into a cylindrical shell, each panel comprising an oblong cylinder segment of the cylindrical shell; providing a plurality of pairs of ring segments, each pair of ring segments formable into a collar sized and shaped conformably to encircle the cylindrical shell; providing a cradle comprising a first set of the ring segments longitudinally spaced and aligned concentrically to form a semi-cylindrical frame conforming to the cylindrical shell; laying a first set of the panels in the cradle so as to abut respective longitudinal edges of each pair of adjacent panels to form a first semi-cylindrical shell; placing at least one circular spacer upright and concentrically in the first semi-cylindrical shell so as to contact respective inside surfaces of at least some of the panels of the first semi-cylindrical shell whereby the first semi-cylindrical shell supports the at least one circular spacer; laying a second set of the panels atop the first semi-cylindrical shell and the at least one circular spacer so as to abut respective longitudinal edges of each pair of adjacent panels to form a second semi-cylindrical shell atop the first semi-cylindrical shell and the at least one circular spacer, and so as to abut respective longitudinal edges of outermost adjacent pairs of the first set of panels and the second set of panels, wherein: the at least one circular spacer contacts respective inside surfaces of at least some of the panels of the second semi-cylindrical shell, supports the second semi-cylindrical shell, and maintains a cylindrical shape of the cylindrical shell; the abutting respective longitudinal edges of each pair of adjacent panels forms a joint; and the first semi-cylindrical shell and the second-semi-cylindrical shell together form the cylindrical shell; laying a second set of the ring segments atop the cylindrical shell and the first set of ring segments in pairwise fashion so as to oppose respective adjacent ends of each pair of ring segments thereby forming the collars conformably encircling the cylindrical shell; clamping the cylindrical shell by constricting the collars using constricting means provided at the opposing respective adjacent ends of each pair of ring segments, thereby compressing at least some of the pairs of longitudinal panels at their respective joints; removing the at least one circular spacer, whereby a hollow of the cylindrical shell is unobstructed; using a rolling apparatus to roll the cylindrical shell and collars about a longitudinal axis of the cylindrical shell so as sequentially to bring the joint of each pair of panels to a lower position, and welding an inside seam of the joint when at the lower position; removing the collars from the cylindrical shell; and using the rolling apparatus to roll the cylindrical shell and collars about the longitudinal axis of the cylindrical shell so as sequentially to bring the joint of each pair of panels to an upper position, and welding an outside seam of the joint when at the upper position.

Example 2. A method of manufacturing a cylindrical cargo container, the method comprising: providing a plurality of rigid panels together formable into a cylindrical shell, each panel comprising a cylinder segment of the cylindrical shell; providing a plurality of pairs of ring segments, each pair of ring segments formable into a collar sized and shaped conformably to encircle the cylindrical shell; providing a cradle formed from a first set of the ring segments; laying a first set of the panels in the cradle to form a first semi-cylindrical shell; placing at least one spacer in the first semi-cylindrical shell; laying a second set of the panels atop the first semi-cylindrical shell and the at least one spacer to form a second semi-cylindrical shell, the first semi-cylindrical shell and the second-semi-cylindrical shell together forming the cylindrical shell, the at least one spacer spacing the panels to maintain a cylindrical shape of the cylindrical shell; laying a second set of the ring segments atop the cylindrical shell and the first set of ring segments in pairwise fashion so as to form the collars conformably encircling the cylindrical shell; clamping the cylindrical shell by constricting the collars using constricting means provided at each collar, thereby compressing joints formed at abutting respective edges of each pair of adjacent panels; removing the at least one spacer, whereby a hollow of the cylindrical shell is unobstructed; using a rolling apparatus to roll the cylindrical shell and collars about a longitudinal axis of the cylindrical shell so as sequentially to bring the joint of each pair of panels to a lower position, and welding an inside seam of the joint when at the lower position; removing the collars from the cylindrical shell; using the rolling apparatus to roll the cylindrical shell and collars about a longitudinal axis of the cylindrical shell so as sequentially to bring the joint of each pair of panels to an upper position, and welding an outside of the joint when at the upper position.

Example 3. A method of manufacturing a cylindrical cargo container, the method comprising: providing a plurality of rigid panels, each panel comprising a cylinder segment; forming a cylindrical shell from the panels; forming at least one collar conformably encircling the cylindrical shell; constricting the at least one collar to compress longitudinal joints formed at abutting edges of pairs of adjacent panels; moving respective joints of pairs of panels to a lower position, and welding respective inside seams of the joints when at the lower position.

Example 4. The method according to Example 3, wherein each panel comprises an oblong cylinder segment of the cylindrical shell.

Example 5. The method according to Example 3 or 4, wherein forming the cylindrical shell from the panels comprises: forming a first semi-cylindrical shell from a first set of the panels; forming a second semi-cylindrical shell from a second set of the panels; and forming the cylindrical shell from the first semi-cylindrical shell and the second semi-cylindrical shell.

Example 6. The method according to any one of Examples 3 to 5, wherein each of the at least one collar comprises a pair of ring segments formable into the collar sized and shaped conformably to encircle the cylindrical shell.

Example 7. The method according to Example 6 when dependent on Example 5, wherein forming the first semi-cylindrical shell from a first set of the panels comprises: providing a cradle comprising a first set of the ring segments longitudinally spaced and aligned concentrically to form a semi-cylindrical frame conforming to the cylindrical shell; and laying a first set of the panels in the cradle so as to abut respective longitudinal edges of each pair of adjacent panels to form the first semi-cylindrical shell.

Example 8. The method according to Example 5, or Examples 6 or 7 when dependent on Example 5, wherein forming the second semi-cylindrical shell from a second set of the panels comprises: assembling a second set of the panels so as to abut respective longitudinal edges of each pair of adjacent panels to form the second semi-cylindrical shell.

Example 9. The method according to Example 8, wherein forming the cylindrical shell from the first semi-cylindrical shell and the second semi-cylindrical shell comprises: laying the second semi-cylindrical shell atop the first semi-cylindrical shell so as to abut respective longitudinal edges of outermost adjacent pairs of the first set of panels and the second set of panels, wherein the abutting respective longitudinal edges of each pair of adjacent panels forms a joint.

Example 10. The method according to Example 8, wherein forming the second semi-cylindrical shell from the second set of the panels, and forming the cylindrical shell from the first semi-cylindrical shell and the second semi-cylindrical shell, comprises: laying the second set of the panels atop the first semi-cylindrical shell so as to abut respective longitudinal edges of each pair of adjacent panels to form the second semi-cylindrical shell atop the first semi-cylindrical shell, and so as to abut respective longitudinal edges of outermost adjacent pairs of the first set of panels and the second set of panels, wherein the abutting respective longitudinal edges of each pair of adjacent panels forms a joint.

Example 11. The method according to Example 9 or 10, wherein the respective longitudinal edges of each pair of adjacent panels comprise a tongue and a groove, and the joint is formed by mating the tongue of one panel with the groove of the abutting panel.

Example 12. The method according to Example 10 or 11 further comprising: after forming the first semi-cylindrical shell from the first set of the panels, and before forming the cylindrical shell from the first semi-cylindrical shell and the second semi-cylindrical shell, placing at least one spacer in the first semi-cylindrical shell, the at least one spacer spacing at least some of the panels to maintain a cylindrical shape of the cylindrical shell.

Example 13. The method according to Example 12, wherein the at least one spacer is circular.

Example 14. The method according to Example 12 or 13, wherein placing at least one spacer in the first semi-cylindrical shell comprises placing the at least one spacer upright and concentrically in the first semi-cylindrical shell so as to contact respective inside surfaces of at least some of the panels of the first semi-cylindrical shell whereby the first semi-cylindrical shell supports the at least one spacer.

Example 15. The method according to any one of Examples 12 to 14, wherein forming the second semi-cylindrical shell from the second set of the panels, and forming the cylindrical shell from the first semi-cylindrical shell and the second semi-cylindrical shell, further comprises: laying the second set of the panels atop the first semi-cylindrical shell and the at least one spacer so as to abut the respective longitudinal edges of each pair of the adjacent panels to form the second semi-cylindrical shell atop the first semi-cylindrical shell and the at least one spacer, and so as to abut the respective longitudinal edges of the outermost adjacent pairs of the first set of panels and the second set of panels, wherein: the at least one spacer contacts respective inside surfaces of at least some of the panels of the second semi-cylindrical shell, supports the second semi-cylindrical shell, and maintains a cylindrical shape of the cylindrical shell.

Example 16. The method according to any one of Examples 12 to 15, further comprising, after constricting the at least one collar to compress the longitudinal joints formed at the abutting edges of pairs of adjacent panels, and before welding the respective inside seams of the joints when at the lower position: removing the at least one spacer, whereby an interior of the cylindrical shell is unobstructed.

Example 17. The method according to any one of Examples 12 to 16, wherein the at least one spacer comprises at least one circular spacing disk.

Example 18. The method according to Example 17, wherein the at least one spacing disk comprising a first semi-disk and a second semi-disk configured for rigid assembly to form the circular spacing disk and configured for disassembly, wherein removing the at least one spacer comprises disassembling the at least one spacing disk into the first semi-disk and the second semi-disk and removing the first semi-disk and the second semi-disk from the interior of the cylindrical shell.

Example 19. The method according to any one of Examples 12 to 16, wherein the at least one spacer comprises at least one circular spacing ring comprising an annular rim formed with an outer U-shaped channel sized and shaped fittingly to receive an inflatable annular tube.

Example 20. The method according to Example 19, wherein removing the at least one spacer comprises deflating the inflatable annular tube to reduce pressure between the inflatable annular tube and an inside surface of the cylindrical shell, and removal of the circular spacing ring from an interior of the cylindrical shell.

Example 21. The method according to Example 7 or any one of Examples 8 to 20 when dependent on Example 7, wherein forming the at least one collar conformably encircling the cylindrical shell comprises: laying a second set of the ring segments atop the cylindrical shell and the first set of ring segments in pairwise fashion so as to oppose respective adjacent ends of each pair of ring segments thereby forming the collars conformably encircling the cylindrical shell.

Example 22. The method according to Example 6 or any one of Examples 7 to 21 when dependent on Example 6, wherein constricting the at least one collar to compress the longitudinal joints formed at abutting edges of pairs of adjacent panels comprises: clamping the cylindrical shell by constricting the collars using constricting means provided at the opposing respective adjacent ends of each pair of ring segments, thereby compressing at least some of the pairs of longitudinal panels at their respective joints.

Example 23. The method according to any one of Examples 3 to 22, wherein moving the respective joints of pairs of panels to the lower position, and welding the respective inside seams of the joints when at the lower position, comprises sequentially moving the respective joints of the pairs of panels to the lower position, and welding the inside seam of the joint when at the lower position.

Example 24. The method according to any one of Examples 3 to 23, further comprising, after welding the inside seams of the joints: removing the at least one collar from the cylindrical shell; moving the respective joints of the pairs of panels to an upper position, and welding respective outside seams of the joints when at the upper position.

Example 25. The method according to Example 24, wherein moving the respective joints of pairs of panels to the upper position, and welding the respective outside seams of the joints when at the upper position, comprises sequentially moving the respective joints of the pairs of panels to the upper position, and welding the outside seam of the joint when at the upper position.

Example 26. The method according to any one of Examples 3 to 25, wherein moving the respective joints of pairs of panels to the lower position comprises rolling the cylindrical shell and at least one collar to bring the respective joints of pairs of panels to the lower position.

Example 27. The method according to Example 24 or 25, wherein moving the respective joints of pairs of panels to the upper position comprises rolling the cylindrical shell and at least one collar to bring the respective joints of pairs of panels to the upper position.

Example 28. The method according to Example 26 or 27, wherein rolling the cylindrical shell and at least one collar comprises rolling the cylindrical shell and at least one collar together about a longitudinal axis of the cylindrical shell.

Example 29. The method according to any one of Examples 26 to 28, wherein rolling the cylindrical shell and at least one collar comprises rolling the cylindrical shell and at least one collar together using a rolling apparatus.

Example 30. The method according to Example 29, wherein the rolling apparatus comprises a tank roller.

Example 31. The method according to Example 29, wherein the rolling apparatus comprises a raised roller apparatus comprising at least a pair of raised roller carriages each comprising a frame supporting a roller assembly mounted on the frame, the roller assembly having at least one roller for contacting and supporting the cylindrical shell at an inner surface of a top half of the cylindrical shell, wherein the rollers are turnable for rolling of the cylindrical shell about a longitudinal axis of the cylindrical shell.

Example 32. The method according to Example 31, wherein at least one of the raised roller carriages is configured to roll along a track for positioning of the raised roller carriage to move an upper portion of the frame and the roller assembly into the cylindrical shell for placement of the cylindrical shell onto the roller assembly to support the cylindrical shell on the rollers.

Example 33. The method according to any one of Examples 3 to 32, wherein at least one of the panels comprises a projection, and the at least one collar comprises a recess sized and shaped fittingly to receive the projection.

Example 34. The method according to Example 33, wherein the projection comprises a longitudinal rail.

Example 35. The method according to any one of Examples 1 to 34, wherein the lower position is angularly displaced from a lowermost point by less than 90°.

Example 36. The method according to any one of Examples 1 to 34, wherein the lower position is angularly displaced from a lowermost point by less than 70°.

Example 37. The method according to any one of Examples 1 to 34, wherein the lower position is angularly displaced from a lowermost point by less than 45°.

Example 38. The method according to any one of Examples 1 to 34, wherein the lower position is angularly displaced from a lowermost point by less than 10°.

Example 39. The method according to Example 1, 2, or 24, or any one of Examples 25 to 38 when dependent on Example 24, wherein the upper position is angularly displaced from an uppermost point by less than 90°.

Example 40. The method according to Example 1, 2, or 24, or any one of Examples 25 to 38 when dependent on Example 24, wherein the upper position is angularly displaced from an uppermost point by less than 70°.

Example 41. The method according to Example 1, 2, or 24, or any one of Examples 25 to 38 when dependent on Example 24, wherein the upper position is angularly displaced from an uppermost point by less than 45°.

Example 42. The method according to Example 1, 2, or 24, or any one of Examples 25 to 38 when dependent on Example 24, wherein the upper position is angularly displaced from an uppermost point by less than 10°.

Example 43. The method according to any one of Examples 1 to 42, wherein the cylindrical cargo container constitutes at least a part of a tanker truck, a tanker trailer, or a tanker railcar.

Example 44. The method according to any one of Examples 1 to 43, wherein, prior to welding the inside seams of the joints of the pairs of panels, the cylindrical shell is free, or substantially free, of tack welds.

Example 45. The method according to any one of Examples 1 to 44, wherein, prior to clamping the cylindrical shell by constricting the collars, the cylindrical shell is free, or substantially free, of tack welds.

Example 46. A cylindrical cargo container manufactured by the method according to any one of Examples 1 to 45.

Example 47. A cylindrical cargo container formed of a plurality of rigid panels into a cylindrical shell, wherein adjacent pairs of the panels are joined by single final welds and are free or substantially free of tack welds.

Example 48. An apparatus for manufacturing a cylindrical cargo container comprising a cylindrical shell, the apparatus comprising: a cradle comprising a first set of ring segments longitudinally spaced and aligned concentrically to form a semi-cylindrical frame; a second set of ring segments corresponding respectively pairwise to the first set of ring segments, wherein each pair of the first set of ring segments and the second set of ring segments is configured for assembly to form a corresponding annular collar, to form a cylindrical frame from the cradle and the second set of ring segments; and constricting means at at least one of the collars to constrict the collar.

Example 49. The apparatus according to Example 48, comprising constricting means at a plurality of the collars.

Example 50. The apparatus according to Example 48 or 49, wherein the cradle further comprises at least one longitudinal frame member, wherein the first set of ring segments are rigidly mounted on the at least one longitudinal frame member to space the first set of ring segments longitudinally and align them concentrically.

Example 51. The apparatus according to any one of Examples 48 to 50, further comprising a rolling apparatus configured to roll the cylindrical frame about a longitudinal axis of the cylindrical frame.

Example 52. The apparatus according to Example 51, wherein the rolling apparatus comprises a tank roller.

Example 53. The apparatus according to any one of Examples 48 to 50, further comprising a raised roller apparatus configured to roll a cylindrical shell formed using the cylindrical frame, the raised roller apparatus comprising at least a pair of raised roller carriages each comprising a frame supporting a roller assembly mounted on the frame, the roller assembly having at least one roller for contacting and supporting the cylindrical shell at an inner surface of a top half of the cylindrical shell, wherein the rollers are turnable for rolling of the cylindrical shell about a longitudinal axis of the cylindrical shell.

Example 54. The apparatus according to Example 53, wherein at least one of the raised roller carriages is configured to roll along a track for positioning of the raised roller carriage to move an upper portion of the frame and the roller assembly into the cylindrical shell for placement of the cylindrical shell onto the roller assembly to support the cylindrical shell on the rollers.

Example 55. The apparatus according to any one of Examples 48 to 54 further comprising at least one spacer to maintain a cylindrical shape of the cylindrical shell during manufacturing of the cylindrical cargo container.

Example 56. The apparatus according to Example 55, wherein the at least one spacer comprises at least one circular spacing disk.

Example 57. The apparatus according to Example 56, wherein the at least one spacing disk comprising a first semi-disk and a second semi-disk configured for rigid assembly to form the circular spacing disk and configured for disassembly.

Example 58. The apparatus according to Example 55, wherein the at least one spacer comprises at least one circular spacing ring comprising an annular rim formed with an outer U-shaped channel sized and shaped fittingly to receive an inflatable annular tube.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of manufacturing a cylindrical cargo container, the method comprising:
   providing a plurality of rigid panels, each panel comprising a cylinder segment;
   forming a cylindrical shell from the panels;
   forming at least one collar conformably encircling the cylindrical shell;
   constricting the at least one collar to compress longitudinal joints formed at abutting edges of pairs of adjacent panels;
   moving respective joints of pairs of panels to a lower position, and welding respective inside seams of the joints when at the lower position;
   wherein the at least one collar comprises a pair of ring segments formable into the collar sized and shaped to conformably encircle the cylindrical shell;
   wherein forming the cylindrical shell from the panels comprises:
      forming a first semi-cylindrical shell from a first set of the panels;
      forming a second semi-cylindrical shell from a second set of the panels; and
      forming the cylindrical shell from the first semi-cylindrical shell and the second semi-cylindrical shell;
   wherein forming the first semi-cylindrical shell from the first set of the panels comprises:
      providing a cradle comprising a first set of ring segments longitudinally spaced and aligned concentrically to form a semi-cylindrical frame conforming to the cylindrical shell; and
      laying the first set of the panels in the cradle so as to abut respective longitudinal edges of each pair of adjacent panels to form the first semi-cylindrical shell;
   wherein forming the second semi-cylindrical shell from the second set of the panels comprises:
      assembling the second set of the panels so as to abut respective longitudinal edges of each pair of adjacent panels to form the second semi-cylindrical shell;
   wherein forming the second semi-cylindrical shell from the second set of the panels, and forming the cylindrical shell from the first semi-cylindrical shell and the second semi-cylindrical shell, comprises:
      laying the second set of the panels atop the first semi-cylindrical shell so as to abut respective longitudinal edges of each pair of adjacent panels to form the second semi-cylindrical shell atop the first semi-cylindrical shell, and so as to abut respective longitudinal edges of outermost adjacent pairs of the first set of panels and the second set of panels, wherein the abutting respective longitudinal edges of each pair of adjacent panels forms a joint; and after forming the first semi-cylindrical shell from the first set of the panels, and before forming the cylindrical shell from the first semi-cylindrical shell and the second semi-cylindrical shell, placing at least one spacer in the first semi-cylindrical shell, the at least one spacer spacing at least some of the panels to maintain a cylindrical shape of the cylindrical shell.

2. The method according to claim 1, wherein placing the at least one spacer in the first semi-cylindrical shell comprises placing the at least one spacer upright and concentrically in the first semi-cylindrical shell so as to contact respective inside surfaces of at least some of the panels of the first semi-cylindrical shell whereby the first semi-cylindrical shell supports the at least one spacer.

3. The method according to claim 1, wherein forming the second semi-cylindrical shell from the second set of the panels, and forming the cylindrical shell from the first semi-cylindrical shell and the second semi-cylindrical shell, further comprises:
   laying the second set of the panels atop the first semi-cylindrical shell and the at least one spacer so as to abut the respective longitudinal edges of each pair of the adjacent panels to form the second semi-cylindrical shell atop the first semi-cylindrical shell and the at least one spacer, and so as to abut the respective longitudinal edges of the outermost adjacent pairs of the first set of panels and the second set of panels, wherein:
   the at least one spacer contacts respective inside surfaces of at least some of the panels of the second semi-cylindrical shell, supports the second semi-cylindrical shell, and maintains a cylindrical shape of the cylindrical shell.

4. The method according to claim 1, further comprising, after constricting the at least one collar to compress the longitudinal joints formed at the abutting edges of pairs of adjacent panels, and before welding the respective inside seams of the joints when at the lower position:
   removing the at least one spacer, whereby an interior of the cylindrical shell is unobstructed.

5. The method according to claim 1, wherein the at least one spacer comprises at least one circular spacing disk.

6. The method according to claim 1, wherein the at least one spacer comprises at least one circular spacing ring comprising an annular rim formed with an outer U-shaped channel sized and shaped to fittingly receive an inflatable annular tube.

7. A method of manufacturing a cylindrical cargo container, the method comprising:
   providing a plurality of rigid panels, each panel comprising a cylinder segment;
   forming a cylindrical shell from the panels;
   forming at least one collar conformably encircling the cylindrical shell;
   constricting the at least one collar to compress longitudinal joints formed at abutting edges of pairs of adjacent panels;
   moving respective joints of pairs of panels to a lower position, and welding respective inside seams of the joints when at the lower position;
   removing the at least one collar from the cylindrical shell; and
   moving the respective joints of the pairs of panels to an upper position, and welding respective outside seams of the joints when at the upper position.

8. The method according to claim 7, wherein moving the respective joints of pairs of panels to the lower position, and welding the respective inside seams of the joints when at the lower position, comprises sequentially moving the respective joints of the pairs of panels to the lower position, and welding the respective inside seams of the joints when at the lower position.

9. The method according to claim 7, wherein moving the respective joints of pairs of panels to the upper position, and welding the respective outside seams of the joints when at the upper position, comprises sequentially moving the respective joints of the pairs of panels to the upper position, and welding the respective outside seams of the joints when at the upper position.

10. The method according to claim 7, wherein moving the respective joints of pairs of panels to the upper position comprises rolling the cylindrical shell and at least one collar to bring the respective joints of pairs of panels to the upper position.

11. The method according to claim 7, wherein at least one of the panels comprises a projection, and the at least one collar comprises a recess sized and shaped to fittingly receive the projection.

12. The method according to claim 7, wherein the lower position is angularly displaced from a lowermost point by less than 10°.

13. The method according to claim 7, wherein the upper position is angularly displaced from an uppermost point by less than 10°.

14. The method according to claim 7, wherein, prior to welding the inside seams of the joints of the pairs of panels, the cylindrical shell is free of tack welds.

15. The method according to claim 7, wherein, prior to compressing the cylindrical shell by constricting the collars, the cylindrical shell is free of tack welds.

16. The method according to claim 7, wherein forming the cylindrical shell from the panels comprises:
   forming a first semi-cylindrical shell from a first set of the panels;
   forming a second semi-cylindrical shell from a second set of the panels; and
   forming the cylindrical shell from the first semi-cylindrical shell and the second semi-cylindrical shell.

17. The method according to claim 16, further comprising:
   after forming the first semi-cylindrical shell from the first set of the panels, and before forming the cylindrical shell from the first semi-cylindrical shell and the second semi-cylindrical shell, placing at least one spacer in the first semi-cylindrical shell, the at least one spacer spacing at least some of the panels to maintain a cylindrical shape of the cylindrical shell.

18. The method according to claim 7, wherein moving the respective joints of pairs of panels to the lower position comprises rolling the cylindrical shell and the at least one collar to bring the respective joints of pairs of panels to the lower position.

19. The method according to claim 18, wherein rolling the cylindrical shell and the at least one collar comprises rolling the cylindrical shell and the at least one collar together about a longitudinal axis of the cylindrical shell.

20. The method according to claim 18, wherein rolling the cylindrical shell and at the least one collar comprises rolling the cylindrical shell and at the least one collar together using a rolling apparatus comprising a tank roller.

21. The method according to claim 18, wherein rolling the cylindrical shell and the at least one collar comprises rolling the cylindrical shell and the at least one collar together using a rolling apparatus comprising a raised roller apparatus comprising at least a pair of raised roller carriages each comprising a frame supporting a roller assembly mounted on the frame, the roller assembly having at least one roller for contacting and supporting the cylindrical shell at an inner surface of a top half of the cylindrical shell, wherein the at least one roller is turnable for rolling of the cylindrical shell about a longitudinal axis of the cylindrical shell.

22. The method according to claim 21, wherein at least one of the raised roller carriages is configured to roll along a track for positioning of the raised roller carriage to move an upper portion of the frame and the roller assembly into the cylindrical shell for placement of the cylindrical shell onto the roller assembly to support the cylindrical shell on the at least one roller.

23. The method according to claim 7, wherein the at least one collar comprises a pair of ring segments formable into the collar sized and shaped to conformably encircle the cylindrical shell.

24. The method according to claim 23,
wherein forming the cylindrical shell from the panels comprises:
forming a first semi-cylindrical shell from a first set of the panels;
forming a second semi-cylindrical shell from a second set of the panels; and
forming the cylindrical shell from the first semi-cylindrical shell and the second semi-cylindrical shell;
wherein forming the first semi-cylindrical shell from the first set of the panels comprises:
providing a cradle comprising a first set of the ring segments longitudinally spaced and aligned concentrically to form a semi-cylindrical frame conforming to the cylindrical shell; and
laying the first set of the panels in the cradle so as to abut respective longitudinal edges of each pair of adjacent panels to form the first semi-cylindrical shell.

25. The method according to claim 24, wherein forming the second semi-cylindrical shell from the second set of the panels comprises:
assembling the second set of the panels so as to abut respective longitudinal edges of each pair of adjacent panels to form the second semi-cylindrical shell.

26. The method according to claim 25, wherein forming the second semi-cylindrical shell from the second set of the panels, and forming the cylindrical shell from the first semi-cylindrical shell and the second semi-cylindrical shell, comprises:
laying the second set of the panels atop the first semi-cylindrical shell so as to abut respective longitudinal edges of each pair of adjacent panels to form the second semi-cylindrical shell atop the first semi-cylindrical shell, and so as to abut respective longitudinal edges of outermost adjacent pairs of the first set of panels and the second set of panels, wherein the abutting respective longitudinal edges of each pair of adjacent panels forms a joint.

27. The method according to claim 26, wherein the respective longitudinal edges of each pair of adjacent panels comprise a tongue and a groove, and the joint is formed by mating the tongue of one panel with the groove of the abutting panel.

28. The method according to claim 24, wherein forming the at least one collar conformably encircling the cylindrical shell comprises:
laying a second set of the ring segments atop the cylindrical shell and the first set of ring segments in pairwise fashion so as to oppose respective adjacent ends of each pair of ring segments thereby forming the collars conformably encircling the cylindrical shell.

29. The method according to claim 23, wherein constricting the at least one collar to compress the longitudinal joints formed at abutting edges of pairs of adjacent panels comprises:
clamping the cylindrical shell by constricting the collars using constricting means provided at the opposing respective adjacent ends of the ring segments, thereby compressing at least some of the pairs of longitudinal panels at their respective joints.

* * * * *